(12) United States Patent
Wang et al.

(10) Patent No.: US 10,201,009 B1
(45) Date of Patent: Feb. 5, 2019

(54) METHODS AND APPARATUS FOR PROTECTING TRANSMISSIONS IN A WIRELESS COMMUNICATION NETWORK

(71) Applicant: Marvell International Ltd., Hamilton (BM)

(72) Inventors: Lei Wang, San Diego, CA (US); Liwen Chu, San Ramon, CA (US); Jinjing Jiang, San Jose, CA (US); Yakun Sun, Sunnyvale, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 40 days.

(21) Appl. No.: 15/236,230

(22) Filed: Aug. 12, 2016

Related U.S. Application Data

(60) Provisional application No. 62/204,797, filed on Aug. 13, 2015.

(51) Int. Cl.
*H04W 74/04* (2009.01)
*H04W 74/00* (2009.01)
(Continued)

(52) U.S. Cl.
CPC ....... *H04W 74/002* (2013.01); *H04W 72/005* (2013.01); *H04W 72/04* (2013.01); *H04W 76/10* (2018.02)

(58) Field of Classification Search
USPC .... 370/329, 230.1, 310, 338, 337, 346, 449, 370/468
See application file for complete search history.

(56) References Cited

U.S. PATENT DOCUMENTS 7,599,332 B2   10/2009   van Zelst et al.
7,742,390 B2    6/2010   Mujtaba
(Continued)

FOREIGN PATENT DOCUMENTS

WO   WO-2012/122119   9/2012

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

(Continued)

*Primary Examiner* — Phuongchau Ba Nguyen

(57) ABSTRACT

A channel access timer at a communication device is set to a duration for which a shared communication medium is expected to be busy in a basic service set (BSS) heard by the communication device. The channel access timer is counted down. Before the channel access timer reaches zero, respective indications of respective contention free period durations in multiple basic service sets (BSSs) heard by the communication device are recorded in a BSS record maintained by the communication device. Recording the respective indications includes recording, for each particular BSS of the multiple BSSs, (i) an identifier of the particular BSS and (ii) an offset value corresponding to an offset of an end of a contention free period in the particular BSS from an end of a contention free period in the BSS based on which the channel access timer is currently set at the communication device.

18 Claims, 9 Drawing Sheets

(51) Int. Cl.
*H04W 72/00* (2009.01)
*H04W 72/04* (2009.01)
*H04W 76/10* (2018.01)

(56) References Cited

U.S. PATENT DOCUMENTS

| | | | |
|---|---|---|---|
| 8,068,455 | B2 | 11/2011 | Utsunomiya et al. |
| 8,155,138 | B2 | 4/2012 | van Nee |
| 8,289,869 | B2 | 10/2012 | Sawai |
| 8,363,578 | B1 | 1/2013 | Ramamurthy et al. |
| 8,526,351 | B2 | 9/2013 | Fischer et al. |
| 8,619,907 | B2 | 12/2013 | Mujtaba et al. |
| 8,670,399 | B2 | 3/2014 | Liu et al. |
| 8,724,720 | B2 | 5/2014 | Srinivasa et al. |
| 8,737,405 | B2 | 5/2014 | Liu et al. |
| 8,787,338 | B2 | 7/2014 | Liu et al. |
| 8,787,385 | B2 | 7/2014 | Liu et al. |
| 8,811,203 | B1 | 8/2014 | Liu et al. |
| 8,867,653 | B2 | 10/2014 | Zhang et al. |
| 8,871,350 | B2 | 10/2014 | Nakayama |
| 8,886,755 | B1 | 11/2014 | Liu et al. |
| 8,923,118 | B1 | 12/2014 | Liu et al. |
| 8,948,283 | B2 | 2/2015 | Zhang |
| 8,971,350 | B1 | 3/2015 | Liu |
| 8,982,889 | B2 | 3/2015 | Zhang |
| 9,130,727 | B2 | 9/2015 | Zhang et al. |
| 9,197,298 | B2 | 11/2015 | Kim et al. |
| 9,215,055 | B2* | 12/2015 | Chu ............... H04L 5/0037 |
| 9,226,294 | B1 | 12/2015 | Liu et al. |
| 9,258,178 | B2 | 2/2016 | Zhang |
| 2009/0196163 | A1 | 8/2009 | Du |
| 2012/0327870 | A1* | 12/2012 | Grandhi ............ H04W 28/06 |
| | | | 370/329 |
| 2013/0229996 | A1 | 9/2013 | Wang et al. |
| 2015/0131517 | A1 | 5/2015 | Chu et al. |
| 2015/0146653 | A1 | 5/2015 | Zhang et al. |
| 2015/0146654 | A1 | 5/2015 | Chu et al. |
| 2016/0242210 | A1* | 8/2016 | Seok ............... H04W 28/18 |

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

IEEE P802.11ah™/D1.3 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-466 (Apr. 2014).

IEEE P802.11ah™/D5.0 "Draft Standard for Information Technology—Telecommunications and information exchange between systems Local and metropolitan area networks—Specific requirements, Part 11: Wireless LAN Medium Access Control (MAC) and Physical Layer (PHY) Specifications: Amendment 2: Sub 1 GHz License Exempt Operation," *The Institute of Electrical and Electronics Engineers, Inc.*, pp. 1-632 (Mar. 2015).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11n™ D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).

Cariou et al., "Multi-channel Transmissions," Doc. No. IEEE 802.11-09/1022r0, *The Institute of Electrical and Electronics Engineers, Inc.*, pp. 1-13 (Sep. 2009).

Chen, "Home Network Basis: Transmission Environments and Wired/Wireless Protocols," Prentice Hall, pp. 1-26 (Jul. 2006).

Chun et al., "Legacy Support on HEW frame structure," doc: IEEE 11-13/1057r0, *The Institute of Electrical and Electronics Engineers, Inc.*, pp. 1-8 (Sep. 2013).

Hiertz et al., "The IEEE 802.11 Universe," IEEE Communications Magazine, pp. 62-70, (Jan. 2010).

De Vegt, "Potential Compromise for 802.11ah Use Case Document", Institute of Electrical and Electronics Engineers, doc. No. IEEE 802.11-11/0457r0, pp. 1-27 (Mar. 2011).

Lee et al., "TGaf PHY proposal," *The Institute of Electrical and Electronics Engineers*, doc. No. IEEE 802.11-12/0809r5, pp. 1-43 (Jul. 10, 2012).

Liu et al., "VHT BSS Channel Selection," *Institute of Electrical and Electronics Engineers, Inc.*, doc. No. IEEE 802.11-11/1433r0, pp. 1-10 (Nov. 2011).

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Noh et al., "Channel Selection and Management for 11ac," Doc. No. IEEE 802.11-10/0593r1, *The Institute of Electrical and Electronics Engineers, Inc.*, pp. 1-21 (May 20, 2010).

Park et al., "Low Power Capability Support for 802.11ah," doc. No. IEEE 802.11-11/0060r1, *The Institute for Electrical and Electronics Engineers*, 7 pages (Jan. 17, 2011).

Park, "IEEE 802.11ac: Dynamic Bandwidth Channel Access," 2011 IEEE Int'l Conf. on Communications (ICC), pp. 1-5 (Jun. 2011).

(56) References Cited

OTHER PUBLICATIONS

Park, "Proposed Specification Framework for TGah D9.x", The Institute of Electrical and Electronics Engineers, doc. No. IEEE 802.11-yy/xxxxr0, pp. 1-30 (Jul. 2012).

Park, "Proposed Specification Framework for TGah", *The Institute of Electrical and Electronics Engineers*, doc. No. IEEE 802.11--yy/xxxxr05, pp. 1-12 (Jan. 2012).

Park, "Proposed Specification Framework for TGah", *The Institute of Electrical and Electronics Engineers*, doc. No. IEEE 802.11-11/1137r11, pp. 1-36 (Sep. 2012).

Park, "Proposed Specification Framework for TGah", *The Institute of Electrical and Electronics Engineers*, doc. No. IEEE 802.11-11/1137r6, pp. 1-13 (Mar. 2012).

Park, "Specification Framework for TGah," *The Institute of Electrical and Electronics Engineers*, doc. No. IEEE 802.11-11/1137r13, pp. 1-58 (Jan. 14, 2013).

Pedersen et al., "Carrier Aggregation for LTE-Advanced: Functionality and Performance Aspects," IEEE Communications Magazine, vol. 49, No. 6, pp. 89-95, (Jun. 1, 2011).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Redieteab et al., "Cross-Layer Multichannel Aggregation for Future WLAN Systems," 2010 IEEE Int'l Conf. on Communication Systems (ICCS), pp. 740-756 (Nov. 2010).

Seok et al., "HEW PPDU Format for Supporting MIMO-OFDMA," IEEE 802.11-14/1210r0, 16 pages, (Sep. 14, 2014).

Shao, "Channel Selection for 802.11ah," doc.: IEEE 802.11-12/0816r0, pp. 1-11 (Jul. 2012).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Taghavi et al., "Introductory Submission for TGah", doc. No. IEEE 802.11-11/0062r0, *Institute for Electrical and Electronics Engineers*, pp. 1-5 (Jan. 14, 2011).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Van Nee et al. "The 802.11n MIMO-OFDM Standard for Wireless LAN and Beyond," Wireless Personal Communications, vol. 37, pp. 445-453 (Jun. 2006).

Vermani et al. "Preamble Format for 1 MHz," *The Institute of Electrical and Electronics Engineers*, doc. No. IEEE 802.11-11/1482r2, pp. 1-30 (Nov. 2011).

Vermani et al. "Spec Framework Text for PHY Numerology," *The Institute of Electrical and Electronics Engineers*, doc. No. IEEE 802.11-11/1311r0, pp. 1-5 (Sep. 2011).

Wannstrom, "Carrier Aggregation explained," pp. 1-6 (May 2012).

Yu et al., "Coverage extension for IEEE802.11ah," *The Institute of Electrical and Electronics Engineers*, doc. No. IEEE 802.11-11/003511, pp. 1-10 (Jan. 2011).

Yuan et al., "Carrier Aggregation for LTE-Advanced Mobile Communication Systems," *IEEE Communications Magazine*, pp. 88-93 (Feb. 2010).

Zhang et al., "11ah Data Transmission Flow," *The Institute of Electrical and Electronics Engineers*, doc. No. IEEE 802.11-11/1484r1, pp. 1-15 (Nov. 2011).

Zhang et al., "1 MHz Waveform in Wider BW", *The Institute of Electrical and Electronics Engineers*, doc. No. IEEE 802.11-12/0309r1, pp. 1-10 (Mar. 2012).

Zhang et al., "Beamforming Feedback for Single Stream," *The Institute of Electrical and Electronics Engineers*, doc. No. IEEE 802.11-12/1312r0, pp. 1-22 (Nov. 12, 2012).

U.S. Appl. No. 15/178,307, Chu et al., "Channel Access for Simultaneous Uplink Transmissions by Multiple Communication Devices," filed Jun. 9, 2016.

U.S. Appl. No. 15/192,743, Chu et al., "Methods and Apparatus for Protecting Transmissions in a Wireless Communication Network," filed Jun. 24, 2016.

\* cited by examiner

METHODS AND APPARATUS FOR PROTECTING TRANSMISSIONS IN A WIRELESS COMMUNICATION NETWORK

CROSS-REFERENCE TO RELATED APPLICATION

This disclosure claims the benefit of U.S. Provisional Patent Application No. 62/204,797, filed on Aug. 13, 2015, entitled "NAV Operations and NAV Rules in High Efficiency Wireless (HEW)," the disclosure of which is hereby expressly incorporated herein by reference in its entirety.

FIELD OF THE DISCLOSURE

The present disclosure relates generally to communication networks and, more particularly, to wireless local area networks that utilize orthogonal frequency division multiplexing (OFDM).

BACKGROUND

The Institute for Electrical and Electronics Engineers (IEEE) 802.11 family of Standards (generally "802.11") has gone through several iterations over the last decade. In some of the 802.11 standards, such as 802.11ah and beyond, the identity of the Basic Service Set (BSS) (e.g., as managed by an access point (AP) of the BSS) is indicated in a Physical Layer Convergence Procedure (PLCP) Protocol Data Unit (PPDU) by a set of bits that described the "color" of the BSS. The color of a BSS corresponds to an identifier (ID) of the BSS that is shorter than a BSS identifier (BSSID) defined by 802.11. The BSS color may be contained in the Physical Layer (PHY) Signal (SIG) field in a PHY header of a PPDU, whereas the BSSID is typically included in a media access control (MAC) portion of PPDUs.

SUMMARY

In an embodiment, a method for protecting transmissions in a shared communication medium includes setting, at a communication device, a channel access timer to a duration for which a shared communication medium is expected to be busy in a basic service set (BSS) heard by the communication device. The method also includes counting down, with the communication device, the channel access timer. The method additionally includes before the channel access timer reaches zero, recording, with the communication device in a BSS record maintained by the communication device, respective indications of respective contention free period durations in multiple basic service sets (BSSs) heard by the communication device, including recording, for each particular BSS of the multiple BSSs heard by the communication device, (i) an identifier of the particular BSS and (ii) an offset value corresponding to an offset of an end of a contention free period in the particular BSS from an end of a contention free period in the BSS based on which the channel access timer is currently set at the communication device, so that the communication device can keep track of the respective contention free periods in the multiple BSSs heard by the communication device.

In another embodiment, a communication device comprises a network interface having one or more integrated circuits configured to set a channel access timer to a duration for which a shared communication medium is expected to be busy in a basic service set (BSS) heard by the communication device. The one or more integrated circuits are also configured to count down the channel access timer, and, before the channel access timer reaches zero, record, in a BSS record maintained by the communication device, respective indications of respective contention free period durations in multiple basic service sets (BSSs) heard by the communication device, including recording, for each particular BSS of the multiple BSSs heard by the communication device, (i) an identifier of the particular BSS and (ii) an offset value corresponding to an offset of an end of a contention free period in the particular BSS from an end of a contention free period in the BSS based on which the channel access timer is currently set at the communication device, so that the communication device can keep track of the respective contention free periods in the multiple BSSs heard by the communication device.

DETAILED DESCRIPTION

In embodiments described below, a communication device utilizes a channel access timer mechanism to maintain a prediction of a duration of time for which a communication medium is expected to be busy, such as a duration of time corresponding to a transmit opportunity (TXOP) or a contention free period in a basic service set (BSS) "heard" by the communication device. The communication device sets its channel access timer based, for example, on a duration indication included in a data unit that is received by the communication device but that is not addressed to the communication device, in an embodiment. The communication device then continually counts down the channel access timer, in an embodiment. When the channel access timer reaches zero, the communication device may begin contending for channel access. In an embodiment, before the channel access counter reaches zero, the communication device records, in a BSS record maintained by the communication device, respective indication of contention free durations in multiple BSSs heard by the communication device. Then, if the communication device receives a contention free (CF-free) data unit corresponding to one of the multiple BSSs heard by the communication device, the communication device determines based on the current value of the channel access timer and the BSS record of the communication device, a value for resetting the channel access timer of the communication device, in an embodiment. The communication device then rests its channel access timer to the determined value, in an embodiment. In an embodiment, the determined value ensures that the channel access timer is not reset to zero if there is still an on-going contention free period in one of the multiple BSSs heard by the communication device.

Figure 1:
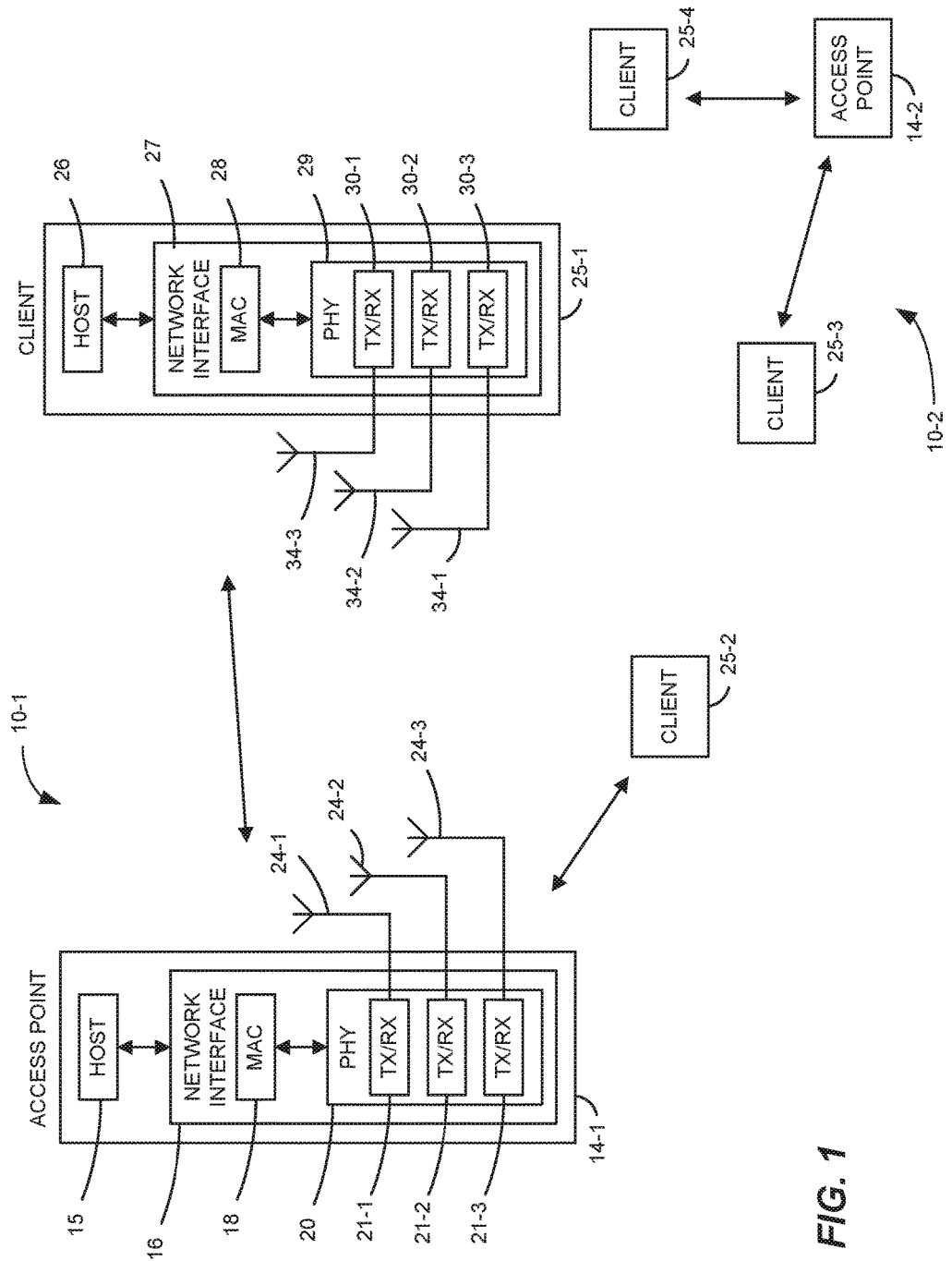
FIG. 1 is a block diagram of an example wireless local area network (WLAN), according to an embodiment.

FIG. 1 is a block diagram of example wireless local area networks (WLANs) 10-1 and 10-2, according to an embodiment. Although two WLANs are illustrated in FIG. 1 for exemplary purposes, other numbers (e.g., 1, 3, 4, 5, 6, etc.) of WLANs are present in other embodiments. Each WLAN 10 includes at least one AP 14. The configuration of the AP 14 may vary among different embodiments, but a typical configuration will now be described, using the AP 14-1 as an example. The AP 14-1 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14-1 includes other suitable numbers (e.g., 1, 2, 4, 5, etc.) of transceivers 21 and antennas 24 in other embodiments. In some embodiments, the AP 14-1 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to at least a first communication protocol (e.g., a High Efficiency, HE, or 802.11 lax communication protocol).

Each WLAN 10 includes a plurality of client stations 25. Although two client stations 25 in each of the WLANs 10 are illustrated in FIG. 1, each of the WLANs 10 includes different numbers (e.g., 1, 2, 3, 5, 6, etc.) of client stations 25 in various scenarios and embodiments.

The configuration of the client station 25 may vary among different embodiments, but a typically configuration will now be described, using the client station 25-1 as an example. The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

In various embodiments, the MAC processor 28 and the PHY processor 29 are configured to operate according to at least the first communication protocol.

In an embodiment, one or more of the other client stations of the WLANs 10 have a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment. These same variations may be present in the client stations 25 of the second WLAN 10-2.

In various embodiments, the MAC processor 18 and the PHY processor 20 of the AP 14-1 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client device 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the first communication protocol and having formats described hereinafter and to determine that such data units conform to the first communication protocol, according to various embodiments.

Figure 2:
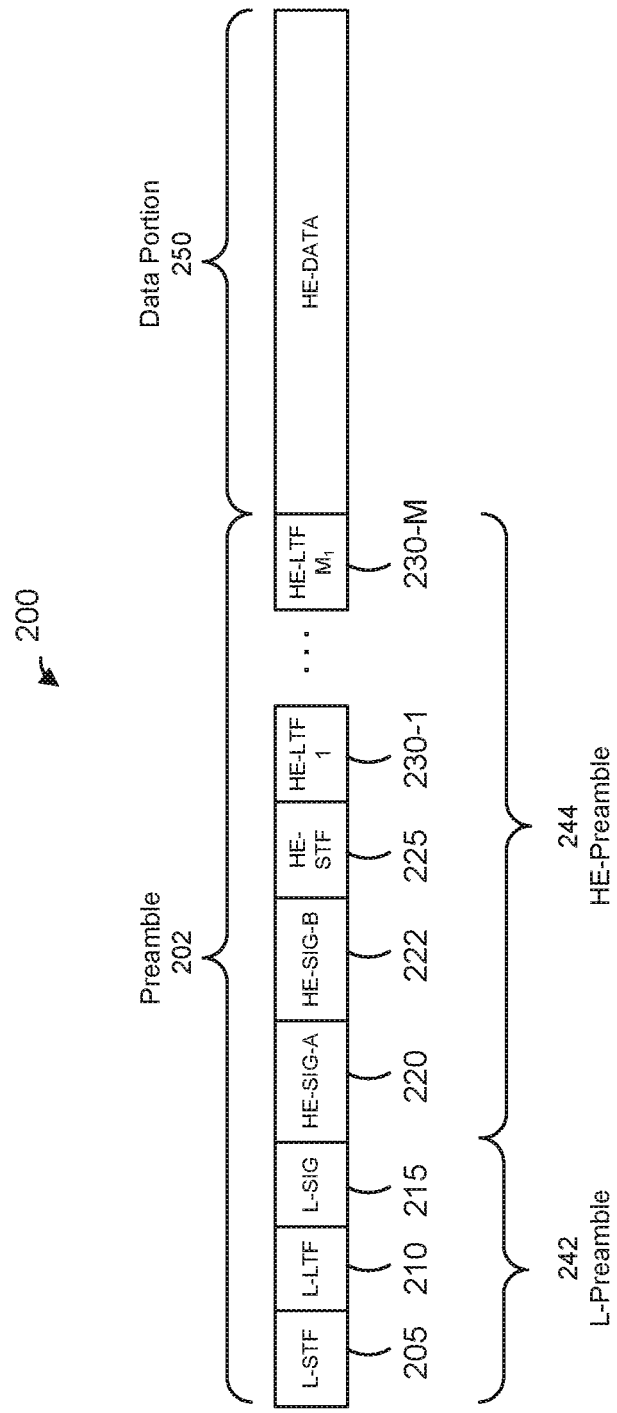
FIG. 2 is a diagram of an example physical layer (PHY) data unit, according to an embodiment.

FIG. 2 is a diagram of a physical layer (PHY) data unit 200 that an AP (e.g., the AP 14-1, the AP 14-2) is configured to transmit to one or more client stations (e.g., one or more client stations 25), according to an embodiment. In an embodiment, one or more client stations (e.g., one or more client stations 25-1) are also configured to transmit data units the same as or similar to the data unit 200 to an AP (e.g., the AP 14-1, the AP 14-2). The data unit 200 conforms to the first communication protocol and occupies a 20 MHz bandwidth. Data units similar to the data unit 200 occupy other suitable bandwidth such as 40 MHz, 80 MHz, 160 MHz, 320 MHz, 640 MHz, for example, or other suitable bandwidths, in other embodiments. The data unit 200 is suitable for "mixed mode" situations, i.e. when the WLAN 10 includes a client station (e.g., the legacy client station 24-4) that conforms to a legacy communication protocol, but not the first communication protocol. The data unit 200 is utilized in other situations as well, in some embodiments.

In various embodiments and/or scenarios, the data unit 200 is a multi-user (MU) data unit downlink (DL) data unit, such as a DL orthogonal frequency division multiple access (OFDMA) unit and/or DL MU multiple input multiple output (MU-MIMO) data unit in which independent data streams are transmitted to multiple client stations 25 using respective sets of OFDM tones and/or respective spatial streams allocated to the client stations 25. Similarly, in various embodiments and/or scenarios, the data unit 200 is an MU uplink (UL) data unit, such as an UL OFDM data unit transmitted by a particular client station 25 as part of an OFDMA uplink transmission by multiple client stations 25 and/or an MU-MIMO uplink transmission, wherein each of the multiple client stations 25 transmits data using a set of OFDM tones and/or respective one or more spatial streams allocated to the client station 25. For example, in an embodiment, available OFDM tones (e.g., OFDM tones that are not used as DC tone and/or guard tones) are partitioned into multiple resource units (RUs), and each of the multiple RUs is allocated to one or more client stations 25 for transmission of data to, or by, the one or more of the client stations 25. In an embodiment, allocation of OFDM tones is performed using basic resource unit blocks defined by the first communication protocol. A basic resource unit block is sometimes referred to herein as simply a "basic resource unit." For example, a basic resource unit includes K OFDM tones, where K is an integer greater than zero, and each allocated resource unit is comprised of one or more K-OFDM tone basic resource units, in an embodiment. As just an example, K=26, in an embodiment. Accordingly, a basic resource unit includes 26 OFDM tones, in this embodiment. A resource unit allocated to a client station 25, or allocated to a multi-user group of client stations 25, includes a number of OFDM tones that is an integer multiple of 26 OFDM tones, such as 26 OFDM tones, 52 OFDM tones, 104 OFDM tones, etc., in this embodiment. In another embodiment, K is any suitable integer other than 26, and a basic resource unit includes a corresponding number of OFDM tones other than 26.

In some embodiments, the data unit 200 is a single user OFDM data unit. For example, the data unit 200 is a DL single user OFDM data unit transmitted by an AP (e.g., the AP 14-1) to a single client station (e.g., the client station 25-1) associated with the AP. In yet another embodiment, the data unit 200 is an UL single user OFDM data unit transmitted by a client station (e.g., the client station 25-1) to an AP (e.g., the AP 14-1) with which the client station is associated.

The data unit 200 includes a PHY preamble 202 including a legacy short training field (L-STF) 205, a legacy long training field (L-LTF) 210, a legacy signal field (L-SIG) 215, a first HE signal field (HE-SIG-A) 220, a second HE signal field (HE-SIG-B) 222, an HE short training field (HE-STF) 225, and M HE long training fields (HE-LTFs) 230. L-STF 205, L-LTF 210 and L-SIG 215 comprise a legacy preamble portion 242 of the PHY preamble 202. The HE-SIG-A 220, the HE-SIG-B 222, the HE-STF 225 and the M HE-LTFs 230 comprise an HE preamble portion 244 of the PHY preamble 202. In some embodiments and/or scenarios, the data unit 200 also includes a data portion 250. In some embodiments and/or scenarios, the data unit 200 omits the data portion 250.

In some embodiments and/or scenarios, the PHY preamble 202 omits one or more of the fields 205-235. For example, the PHY preamble 202 omits the HE-SIG-A 220 and/or the HE-SIG-B 222, in an embodiment. In some embodiments, the PHY preamble 202 includes additional fields not illustrated in FIG. 2.

Each of the L-STF 205, the L-LTF 210, the L-SIG 215, the HE-SIG-A 220, the HE-SIG-B 222, the HE-STF 225, and the M HE-LTFs 230 comprises one or more OFDM symbols. The HE-SIG-A 220 and the HE-SIG-B 222 is each individually encoded to generate the respective number of OFDM symbols, in an embodiment. As merely an example, in an embodiment, the HE-SIG-A 220 comprises two OFDM symbols, and the HE-SIG-B 222 comprises one OFDM symbol. As merely another example, in another embodiment, the HE-SIG-A 220 comprises one OFDM symbol, and the HE-SIG-B comprises two OFDM symbols. As yet another example, in an embodiment, the HE-SIG-A 220 comprises two OFDM symbols, and the HE-SIG-B 222 comprises a variable number of OFDM symbols. In an embodiment in which the HE-SIG-B 222 comprises a variable number of OFDM symbols, the particular number of HE-SIG-B 222 OFDM symbols in the data unit 200 is indicated in the HE-SIG-A 220.

In the embodiment of FIG. 2, the data unit 200 includes one of each of the L-STF 205, the L-LTF 210, the L-SIG 215, and the HE-SIG-A 220. In other embodiments in which a data unit similar to the data unit 200 occupies a cumulative bandwidth other than 20 MHz, each of the L-STF 205, the L-LTF 210, the L-SIG 215 and HE-SIG-A 220 is repeated over a corresponding number of 20 MHz sub-bands of the whole bandwidth of the data unit, in an embodiment. For example, in an embodiment, the data unit occupies an 80 MHz bandwidth and, accordingly, includes four of each of the L-STF 205, the L-LTF 210, the L-SIG 215, and the HE-SIG-A 220. In an embodiment in which a data unit similar to the data unit 200 occupies a cumulative bandwidth other than 20 MHz, the HE-SIG-B 222 is repeated over a corresponding number of 20 MHz sub-bands of the whole bandwidth of the data unit. In another embodiment in which a data unit similar to the data unit 200 occupies a cumulative bandwidth other than 20 MHz, the HE-SIG-B 222 includes different channel-specific portions corresponding to different 20 MHz sub-bands of the whole bandwidth of the data unit, and the different channel specific portions are transmitted in parallel in the corresponding 20 MHz sub-bands of the whole bandwidth of the data unit 200.

In some embodiments, the modulation of different 20 MHz sub-bands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIG-B and the HE data portion occupy the corresponding whole bandwidth of the data unit.

In an embodiment, the HE-SIG-A 220 and the HE-SIG-B 222 generally carry information about the format of the data unit 200, such as information needed to properly decode at least a portion of the data unit 200, in an embodiment. In an embodiment in which the data unit 200 is a multi-user data unit, HE-SIG-A 220 carries information commonly needed by multiple intended receivers of the data unit 200. In some embodiments, HE-SIG-A 220 additionally includes information for receivers that are not intended receivers of the data unit 200, such as information needed for medium protection. On the other hand, HE-SIG-B 222 carries user-specific information individually needed by each intended receiver of the data unit 200, in an embodiment. In an embodiment, HE-SIG-A 220 includes information needed to properly decode HE-SIG-B 222, and HE-SIG-B 222 includes information needed to properly decode data streams in the data portion 250 of the data unit 200. In some embodiments and/or scenarios, however, HE-SIG-A field 220 includes information needed to decode the data portion 250, and HE-SIG-B 222 is omitted from the data unit 200 in at least some such embodiments. In at least some embodiments and scenarios in which an AP (e.g., the AP 14) is the intended recipient of the data unit 200 (i.e., when the data unit 200 is an uplink data unit), information needed to properly decode the data portion of the data unit 200 is known a priori to the intended recipient of the data unit 200 and need not be included in the preamble of the data unit 200. In some such embodiments, the HE-SIG-B 222 is omitted from the data unit 200.

In some embodiments, specific information included in the HE-SIG-A 220 and/or in the HE-SIG-B 222 depends on the mode of transmission of the data unit 200. For example, in an embodiment, different information is included in the HE-SIG-A 220 when the data unit 200 is a downlink data unit as compared to information included in the HE-SIG-A 220 when the data unit 200 is an uplink data unit. Additionally or alternatively, different information is included in the HE-SIG-A 220 when the data unit 200 is a multi-user data unit as compared to information included in the HE-SIG-A 220 when the data unit 200 is a single-user data unit, in an embodiment. In another embodiment, different information is included in the HE-SIG-B 222 when the data unit 200 is a downlink data unit as compared to the information is included in the HE-SIG-B 222 when the data unit 200 is an uplink data unit.

Figure 3:
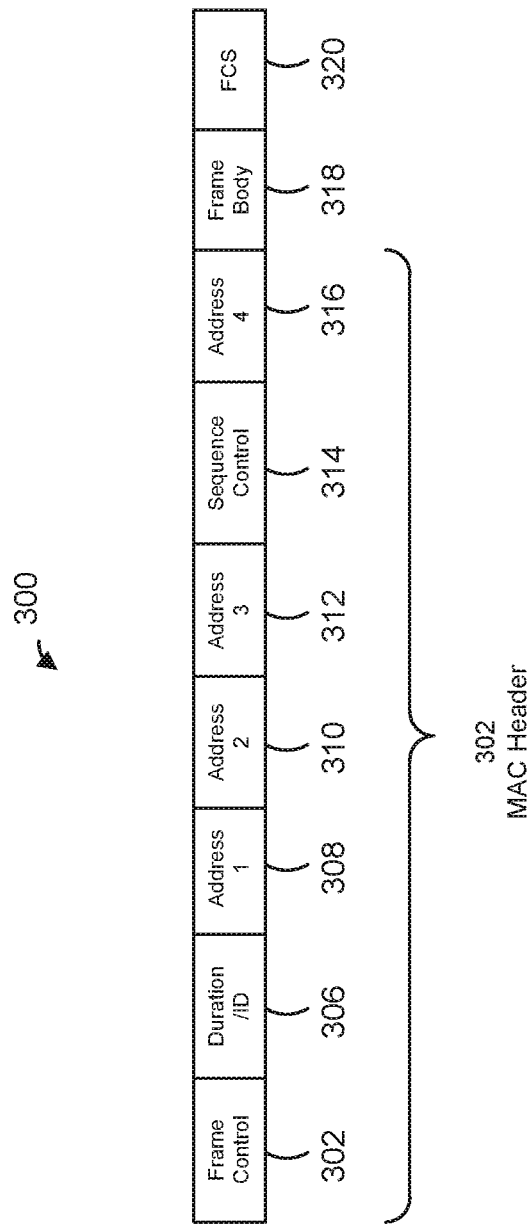
FIG. 3 is a diagram of an example MAC protocol data unit (MPDU), according to an embodiment.

FIG. 3 is a diagram of an example MAC protocol data unit (MPDU) 300, according to an embodiment. In an embodiment, the data portion 250 of the data unit 200 includes one or more MPDUs such as the MPDU 300. The MPDU 206 includes a MAC header 302 having a Frame Control field 304, a Duration/ID field 306, an Address 1 field 308, and Address 2 field 310, an Address 3 field 312, a Sequence Control field 314, and an Address 4 field 316. The MPDU 206 also includes a frame body 318 and a frame check sequence (FCS) 320. In an embodiment, the Duration/ID field 306 includes an indication of a duration of time (e.g., in microseconds) needed for transmission of one or more frame that will follow the data unit 200. For example, the Duration/ID field 306 includes an indication of a duration of time needed for transmission of an acknowledgement data unit to acknowledge receipt of the data unit 200, including a duration of an interframe space between the data unit 200 and the acknowledgement data unit to acknowledge receipt of the data unit 200. As another example, the Duration/ID field 306 includes an indication of an expected remaining duration of a transmission opportunity (TXOP) during which the data unit 200 is being transmitted, where the TXOP includes one or more additional frame exchanges in at least some situations. As yet another example, the Duration/ID field 306 includes an indication of a duration of time needed for (i) transmission of an acknowledgement data unit to acknowledge receipt of the data unit 200, (ii) transmission of at least one additional data unit that will follow the acknowledgement data unit, and (iii) transmission of at least one additional acknowledgement data unit to acknowledge the at least one additional data unit, including interframe spaces between transmissions of the data units.

Figure 4:
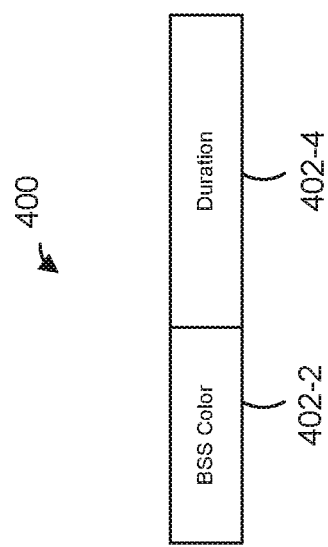
FIG. 4 is a diagram of several subfields included in a PHY preamble of a data unit, according to an embodiment.

FIG. 4 is a diagram of several subfields 402 included in a PHY preamble of a data unit, according to an embodiment. The subfields 402 include a BSS color subfield 402-2 and a duration subfield 402-4. In an embodiment, the BSS color subfield 402-2 and the duration subfield 402-4 are included in the PHY preamble 202 of the data unit 200. For example, the BSS color subfield 402-2 and the duration subfield 402-4 are included in the HE-SIG-A 220 of the PHY preamble 202, in an embodiment. In another embodiment, the BSS color subfield 402-2 and the duration subfield 402-4 are included in the HE-SIG-B 222 of the PHY preamble 202. In yet another embodiment, one of the BSS color subfield 402-2 and the duration subfield 402-4 is included in the HE-SIG-A 220 and the other one of the BSS color subfield 402-2 and the duration subfield 402-4 is included in the HE-SIG-B 222. In other embodiments, the BSS color subfield 402-2 and the duration subfield 402-4 are included in other suitable fields (e.g., one or more other signal fields not shown in FIG. 2) of the PHY preamble 202 of the data unit 200, or are included in a PHY preamble of a suitable data unit different from the data unit 200.

In an embodiment, the BSS color subfield 402-2 includes an identifier of a BSS (e.g., a BSS color) in which the data unit 200 is being transmitted. Accordingly, in an embodiment, a communication device (e.g., AP 14 or client station 25) that transmits the data unit 200 sets the BSS color subfield 402-2 to include the BSS color of a BSS to which the communication device corresponds (e.g., with which the communication device is associated). Thus, for example, if the data unit 200 is transmitted by the AP 14-1 or one or the client stations 25-1, 25-2 of the WLAN 10-1, then the BSS color subfield 402-2 includes an identifier of the BSS corresponding the WLAN 10-1, in an embodiment. On the other hand, if the data unit 200 is transmitted by the AP 14-2 or one or the client stations 25-3, 25-4 of the WLAN 10-2, then the BSS color subfield 402-2 includes an identifier of the BSS corresponding the WLAN 10-2, in an embodiment. In an embodiment, the BSS color of a BSS is shorter (e.g., includes fewer bits) than a BSSID of the BSS, where the BSSID of the BSS is an address (e.g., a MAC address) of an AP of the BSS, for example.

The duration subfield 402-4 is set to indicate a duration of time (e.g., in microseconds) for which the communication medium is expected to be busy, in an embodiment. The duration subfield 402-4 indicates a duration that is the same as or similar to a duration indicated in the Duration/ID field 306, in an embodiment. The duration subfield 402-4, however, includes fewer bits than a number of bits included in the Duration/ID field 306, in some embodiments. In an embodiment, the duration subfield 402-4 includes an indication of a duration of time (e.g., in microseconds) needed for transmission of one or more frame that will follow the data unit 200. For example, the duration subfield 402-4 includes an indication of a duration of time needed for transmission of an acknowledgement data unit to acknowledge receipt of the data unit 200, including a duration of an interframe space between the data unit 200 and the acknowledgement data unit to acknowledge receipt of the data unit 200. As another example, the duration subfield 402-4 includes an expected remaining duration of a transmission opportunity (TXOP) during which the data unit 200 is being transmitted, where the TXOP includes one or more additional frame exchanges in at least some embodiments. As yet another example, the duration subfield 402-4 includes an indication of a duration of time needed for (i) transmission of an acknowledgement data unit to acknowledge receipt of the data unit 200, (ii) transmission of at least one additional data unit that will follow the acknowledgement data unit, and (iii) transmission of at least one additional acknowledgement data unit to acknowledge receipt of the at least one additional data unit, including interframe spaces between transmissions of the data units. The indicated duration of time needed for (i) transmission of the acknowledgement data unit to acknowledge receipt of the data unit 200, (ii) transmission of at least one additional data unit that will follow the acknowledgement data unit, and (iii) transmission of at least one additional acknowledgement data unit to acknowledge receipt of the at least one additional data unit, including interframe spaces between transmissions of the data units, is less than the remaining duration of the TXOP in which the data unit 200 is being transmitted, in some situations, in an embodiment.

In an embodiment, a communication device (e.g., an AP 14 or a client station 25) receiving a data unit decodes one or both (i) a duration indication in a PHY preamble of the data unit (e.g., included in the duration subfield 402-4 of the PHY preamble) and (ii) a duration indication in a MAC header of the data unit (e.g., included in the Duration/ID field 306 of the MAC header). In an embodiment, the communication device then relies on a decoded one of (i) the duration indication in the PHY preamble of the data unit or (ii) the duration indication in the MAC header of the data unit to set or reset its channel access time, such as network allocation vector (NAV) timer, according to rules and techniques described herein. In an embodiment, the duration indication in the MAC header of the data unit includes a greater number of bits than a number of bits of the duration indication in the PHY preamble of the data unit. In an embodiment, a smaller granularity is used to more accurately indicate the duration using the greater number of bits in the MAC header as compared to a less accurate duration indicated using less bits and a larger granularity in the PHY preamble of the data unit. Accordingly, in an embodiment, if a communication device is able to decode the duration indication in the Duration/ID field 306, then the communication device decodes the duration indication in the Duration/ID field 306 and utilizes the duration indicated in the Duration/ID field 306 to set or reset its NAV, in an embodiment. Thus, for example, if the communication device decodes both (i) the duration indication in the duration subfield 402-4 included in the PHY preamble of the data unit and (ii) the duration indication in the Duration/ID field 306 included in the MAC header of the data unit, then the communication device utilizes the duration indicated in the Duration/ID field 306 to set or reset its NAV, in an embodiment. On the other hand, if the communication device is unable to decode the Duration/ID field 306, then the communication device instead utilizes on the duration indicated in the duration subfield 402-4 to set or reset its NAV, in an embodiment.

In an embodiment, a communication device (e.g., a client station 25) maintains records of multiple contention free period durations of concurrent contention free periods in multiple basic service sets heard by the communication device. When the communication device receives a data unit indicating an end of a contention free period, the communication device resets its channel access timer to a longest remaining duration of a contention free period In an embodiment, when a communication device (e.g., a client station 25) receives a data unit (e.g., the data unit 200) not directed to the communication device, the communication device sets its channel access timer based on a duration indicated in the data unit. The communication device continually counts down the channel access timer, in an embodiment. Once the channel access timer reaches zero, the communication device may begin contending for the medium. In an embodiment, the communication device contends for the medium using a clear channel assessment (CCA) with backoff procedure. If the medium is clear for a predetermined duration of time, then the communication device gains access to the medium and begins transmission in the medium, in an embodiment.

In an embodiment, each communication device (e.g., an AP 14 or a client station 25) maintains a channel access timer (e.g., a NAV timer) that indicates a prediction of future traffic in the communication medium in which the communication device communicates with at least one other communication device. For example, the communication device sets a NAV timer based on a duration indication in a data unit received by the communication device but not addressed to the communication device, where the duration indication indicates a time for which the communication medium is expected to be busy. In an embodiment, the communication device records, in a BSS record maintained by the communication device, an indication of a BSS to which the data unit corresponds and a corresponding indication of a duration of the contention free period in the BSS to which the data unit corresponds, in an embodiment. The communication device counts down the NAV timer. If the communication device receives one or more additional data units before the NAV timer reaches zero, the communication device resets the NAV timer and/or updates the BSS record based on each of the one or more additional data units, for example as described below, in various scenarios and embodiments. If the communication device receives a contention free end (CF-end) data unit indicative of an end of a contention free period in a BSS to which the CF-end data unit corresponds, the communication device determines whether the NAV timer of the communication device is currently set based on the BSS to which the CF-end data unit corresponds. If the communication device determines that that the NAV timer is currently not set based on the BSS to which the CF-end data unit corresponds, then the communication device deletes a corresponding entry from the BSS record, in an embodiment. On the other hand, if the communication device determines that the NAV timer is currently set based on the BSS to which the CF-end data unit corresponds, then the communication device determines, based on the BSS record, a value for resetting the NAV timer and resets the NAV timer accordingly, in an embodiment. In general, the communication device resets its NAV to a value that will prevent the communication device from contending for the medium during current contention free periods in BSSs heard by the communication device. The communication device continues to count down the NAV timer starting at the new reset value of the NAV timer, in an embodiment. Once the NAV timer reaches zero, the communication device may begin contending for the medium.

Figure 5:
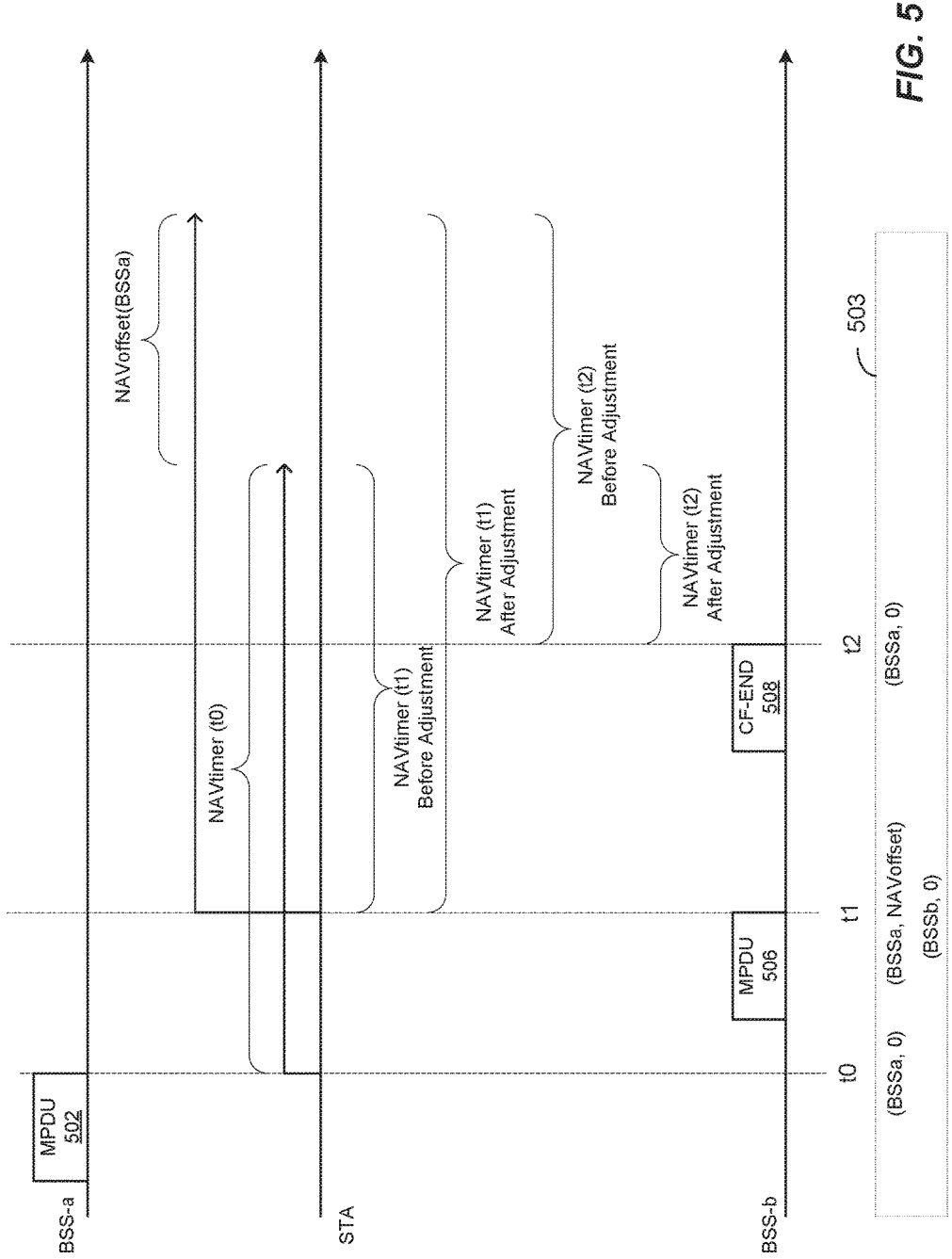
FIG. 5 is a timing diagram of a technique for maintaining a channel access timer at a communication device, according to an embodiment.

FIG. 5 is a timing diagram of a technique 500 for maintaining a channel access timer (e.g., a NAV timer) at a communication device (e.g., an AP or a client station), according to an embodiment. The technique 500 is described as being implemented by the client statin 25-1 of FIG. 1. In other embodiments, an AP 14 or a client station other than the client station 25-1 implements the technique 500. In some embodiments, other communication devices having suitable architectures different than the architectures illustrated in FIG. 1 implement the technique 500.

At a time t0, the client station 25-1 receives a data unit 502. The data unit 502 corresponds to the data unit 200 of FIG. 2, in an embodiment. In another embodiment, the data unit 502 is a suitable data unit different from the data unit 200 of FIG. 2. The data unit 502 corresponds to a BSSa (e.g., the network 10-1). For example, the data unit 502 is transmitted by an AP of the BSSa (e.g., the AP 14-1), in an embodiment. The data unit 502 is transmitted by a client station operating in the BSSa (e.g., the client station 25-2), in another embodiment. The client station 25-1 determines, e.g., based on a destination address included in the data unit 502, that the data unit is not addressed to the client station 25-1.

The client station 25-1 identifies, e.g., based on information included in the data unit 502, the BSS (BSSa) to which the data unit 502 corresponds. The client station 25-1 also obtains, from a duration indication field included in the data unit, a duration (Da1) indicating a time for which a communication medium is expected to be busy, and sets its NAV to the duration Da1, in an embodiment. Additionally, the client station 25-1 records, in a BSS record 503 maintained by the client station 25-1, an entry corresponding to BSSa. In general, an entry in the BSS record 503 has a format of {BSS, NAVoffset}, where BSS is an identifier of a BSS and NAVoffset is an offset value of an end of a contention free period in the BSS from the end of the contention free period in a BSS based on which the NAV timer is currently set, in an embodiment. Thus, in the scenario illustrated in FIG. 5, because the NAV timer is currently set based on BSSa and, accordingly, the offset of the end of the contention free period in the BSSa from the end of the contention free period in the BSS based on which the NAV timer is currently set is zero, the entry, in the BSS record 503, corresponding to BSSa is {BSSa, 0}, in the illustrated embodiment.

At a time t2, the client station 25-1 receives a data unit 504. The data unit 504 corresponds to the data unit 200 of FIG. 2, in an embodiment. In another embodiment, the data unit 504 is a suitable data unit different from the data unit 200 of FIG. 2. The data unit 504 corresponds to a BSSb (e.g., the network 10-2). For example, the data unit 504 is transmitted by an AP of the BSSb (e.g., the AP 14-2), in an embodiment. The data unit 504 is transmitted by a client station operating in the BSSb (e.g., the client station 25-3), in another embodiment. The client station 25-1 determines, e.g., based on a destination address indicated in the data unit 504, that the data unit is not addressed to the client station 25-1. The client station 25-1 obtains, from a duration indication included in the data unit, a duration (Db1) indicating a time for which a communication medium is expected to be busy in the BSSb. Also, the client station 25-1 identifies, e.g., based on BSS identification information included in the data unit 504, the BSS (BSSb) to which the data unit 502 corresponds, in an embodiment.

In an embodiment, the client station 25-1 compares the duration Db1 indicated in the data unit 504 to the current value of the NAV timer (Da1−(t1−t0)). If the duration Db1 is greater than the current value of the NAV timer, as is the case in the scenario illustrated in FIG. 5, then the client station 25-1 resets the NAV timer to the duration Da2. Additionally, the client station 25-1 records, in the BSS record 503, an entry corresponding to BSSb. The entry corresponding to the BSSb includes an identifier of the BSSb and an offset value of zero to indicate that the NAV timer is now set based on BSSb. Additionally, the client station 25-1 updates the entry corresponding to the BSSa in the BSS record 503 to now indicate a non-zero offset value. For example, in an embodiment, the client station 25-1 sets the offset corresponding to the BSSa in the entry 505 to a difference between (i) the value of NAV timer at t1 before the NAV timer is reset to the duration Db1 (NAVtimer(t1)) and (ii) the duration Db1. For example, the client station 25-1 updates the entry 505 corresponding to BSSa to now read {BSSa, NAVtimer(t1)−Db1}, in an embodiment. On the other hand, if the duration Db2 is less than or equal to the current value of the NAV timer, then the client station 25-1 adds an entry corresponding to BSSb to the BSS record 503, where the entry indicates an offset of the end of the contention free period indicated by Db1 and the value of NAVtimer at t1. Accordingly, in this case, the client station 25-1 adds an entry {BSSb, Db1−NAVtimer(t1)}, in an embodiment.

At a time t2, the client station 25-1 receives a data unit 506. The data unit 506 corresponds to the data unit 200 of FIG. 2, in an embodiment. In another embodiment, the data unit 504 is a suitable data unit different from the data unit 200 of FIG. 2. The data unit 506 corresponds to a BSSb (e.g., the network 10-2). For example, the data unit 506 is transmitted by an AP of the BSSb (e.g., the AP 14-2), in an embodiment. The data unit 506 is transmitted by a client station operating in the BSSb (e.g., the client station 25-3), in another embodiment. The data unit 506 is a CF-end data unit indicating an end of a contention free period in BSSb, in an embodiment. For example, the data unit 506 includes a CF-end frame in the data portion of the data unit, in an embodiment.

The client station 25-1 determines that the data unit 506 is a CF-end data unit, in an embodiment. Also, the client station 25-1 identifies, e.g., based on BSS identification information included in the data unit 506, the BSS (BSSb) to which the data unit 506 corresponds. In an embodiment, the client station 25-1 determines whether the NAV timer of the client station 25-1 is currently set based on the BSS to which the data unit 506 corresponds. For example, the client station 25-1 determines whether the NAV timer of the client station 25-1 is currently set based on the BSS to which the data unit 506 corresponds by checking the BSS record 503 to determine whether the offset corresponding to the identified BSS is zero, in an embodiment. If the client station 25-1 determines that the NAV timer is not currently set based on the BSS to which the data unit 506 corresponds, then the client station 25-1 deletes the entry corresponding to this BSS from the BSS record 503, in an embodiment.

On the other hand, if the client station 25-1 determines that the NAV timer is currently set based on the BSS to which the data unit 506 corresponds, as is the case in the scenario illustrated in FIG. 5, then the client station 25-1 determines, based on the BSS record 503, a value for resetting the NAV timer, in an embodiment. To this end, in an embodiment, the client station 25-1 determines whether the BSS record 503 contains any records that have non-zero offsets that indicate on-going contention free periods in corresponding BSSs. In the scenario illustrated in FIG. 5, the BSS record 503 contains only one record with a non-zero offset, corresponding to BSSa. In this scenario, the client station 25-1 determines whether the offset corresponding to BSSa indicates an on-going contention free period in the BSSa. To this end, in an embodiment, the client station 25-1 determines whether a difference between the current value of the NAV timer and the absolute value of the offset corresponding to BSSa (NAVtimer−|NAVoffser(BSSa)|) is greater than zero. If NAVtimer−|NAVoffser(BSSa)| is greater than zero, this indicates that the contention free period in BSSa has not yet finished. In this case, the client station 25-1 resets the NAV timer to the value of NAVtimer−|NAVoffser(BSSa)|, in an embodiment. Additionally, the client station 25-1 sets the offset in the entry, in the BSS record 503, corresponding to BSSa to zero to indicate that the NAV timer is now set based on BSSa, in an embodiment. Further, the client station 25-1 deletes the entry corresponding to BSSb from the BSS record 503, in an embodiment.

On the other hand, if NAVtimer−|NAVoffser(BSSa)| is less than or equal to zero, this indicates that the contention free period in the BSSa has finished. In this case, the client station 25-1 resets the NAV timer to zero, in an embodiment. Additionally, the client station 25-1 deletes both the entry corresponding to BSSb and the entry corresponding to BSSa from the BSS record 503, in an embodiment.

In another embodiment, in which there are multiple entries with non-zero offsets in the BSS record 503, the client station 25-1 determines respective differences between the current value of the NAV timer and the absolute value of each of the multiple non-zero offsets in the BSS record 503. If one or more of the respective differences are greater than zero, then the client station 25-1 selects one of the respective differences as the value for resetting the NAV timer. For example, the client station 25-1 selects the smallest one of the one or more respective differences as the value for resetting the NAV timer, in an embodiment. The client station 25-1 then resets the NAV timer to the selected one of the differences, in an embodiment. Additionally, the client station 25-1 deletes the entry corresponding to the BSSb from the BSS record 503, in an embodiment. Further, the client station 25-1 updates the entry, in the BSS record 503, corresponding to the BSS of the selected one of the differences to zero, and updates offsets in one or more remaining entries in the BSS record 503 to indicate offsets with respect to the new setting of the NAV timer, in an embodiment.

Figure 6A:
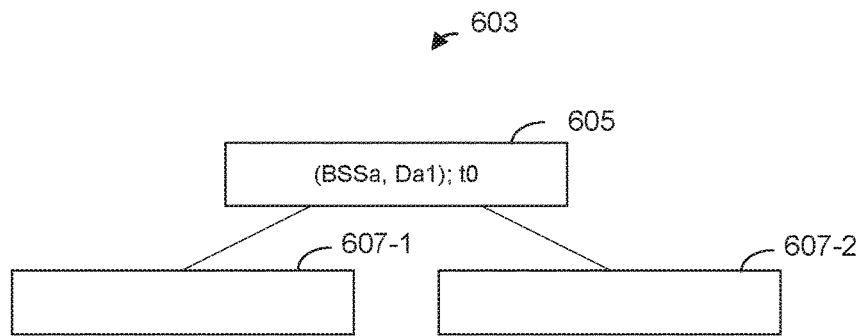
FIGS. 6A-6C are diagrams of an example basic service set (BSS) record, according to an embodiment.
Figure 6B:
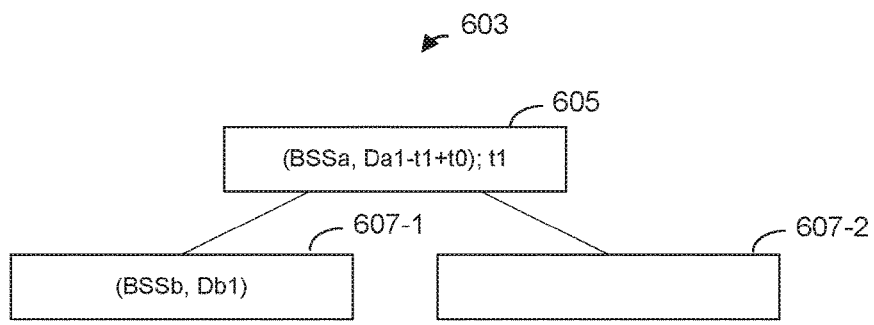
Figure 6C:
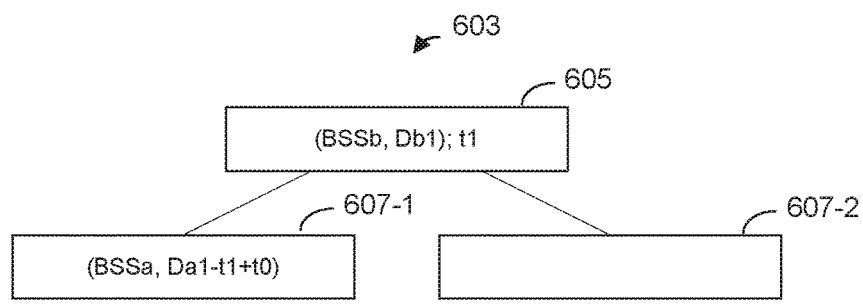

In some embodiments, the client station 25-1 implements a procedure similar to the procedure 500 but using a BSS record having a format different from the format illustrated in FIG. 5. Referring to FIGS. 6A-6C, for example, a BSS record 603 is used instead of the BSS record 503, in some embodiments. The BSS record 603 is organized as a min heap data structure in which each child node includes a value that is greater than or equal to the value included in its parent node, in the illustrated embodiment. In an embodiment, a root node 605 of the BSS record 603 includes an entry having a format {(BSS, Duration); t}, where BSS identifies a BSS based on which the NAV timer is currently set, Duration is the value to which the NAV timer is set, and t is the start time the current NAV timer. Non-root nodes 607 of the BSS record 603 include entries having a format {BSS, Duration}, where BSS identifies a BSS and Duration indicates a remaining duration of a contention free period in the BSS at the time t indicated in the entry of the root node 605, in an embodiment.

In an embodiment, when the NAV timer of the client station 25-1 is not zero, the NAV timer is generally counting down from a duration indicated in the root node 605 stating at the time indicated in the root node 605. If the client station 25-1 receives a data unit that triggers the NAV update procedure when the NAV timer is not zero, then the client station 25-1 determines whether the duration indicated in the data unit is greater than the current value of the NAV timer. If the duration indicated in the data unit is greater than the current value of the NAV timer, then the client station 25-1 updates the BSS record 603 to insert an entry corresponding to the BSS indicated in the data unit into an appropriate child node 607 of the BSS record 603, in an embodiment. Additionally, the client station 25-1 updates the start time t indicated in the root node 605 of the BSS record 603 to the current time at which the data unit is received, in an embodiment. On the other hand, if the duration indicated in the data unit is less than or equal to the current value of the NAV timer, then the client station 25-1 updates all current entries in the BSS record 603 based on the time at which the data unit was received, inserts an entry corresponding to the BSS indicated in the data unit at the root node 605, and resets the NAV timer to the new duration indicated in the root node 605, in an embodiment. In an embodiment, if countdown of the NAV timer at the client station 25-1 is suspended for some period of time and is then restarted, then the client 25-1 updates the time t indicated in the root entry 605 to the new time at which the NAV timer is restarted, and updates durations indicated in entries in the child nodes 607 accordingly based on the new start time indicated in the root entry 605, in an embodiment.

In an embodiment, when the NAV timer reaches zero, the client station 25-1 deletes the entry in the root node 605. Additionally, if there is an entry in the child node 607-1, then the client station 607-1 resets the NAV timer to the duration indicated in the child node 607-1, and records, in the root node 605, an entry corresponding to the BSS indicated in the child node 607-1. Further, the client station 25-1 updates any additional entries in the BSS record 603 using the current time and the time t that was indicated in the root node 605, in an embodiment.

Referring to FIG. 5 and FIGS. 6A-6C, when the client station 25-1 receives the data unit 502 at the time t0, the client station 25-1 sets the NAV timer to the duration Da1 indicated in the data unit 502, and adds an entry {BSSa, Da1}; t0 to the root node 605 of the BSS record 603, as illustrated in FIG. 6A, in an embodiment. When the client station 25-1 receives the data unit 504 at the time t1, the client station 25-1 compares the duration Db1 indicated in the data unit 504 to the current value of the NAV timer at the time t1, NAVtimer(t1), in an embodiment. If Db1 is greater than NAVtimer(t1), as is the case in the scenario illustrated in FIG. 5, then the client station 25-1 sets the entry at the root node 605 of the BSS record 603 to {BSSa, Da1−t1+t0); t1, and adds an entry {BSSb, Db1} to a child node 607-1 of the BSS record 603, as illustrated in FIG. 6B, in an embodiment. On the other hand, if Db1 is less than or equal to NAVtimer (t1), then the client station 25-1 sets the entry at the root node 605 of the BSS record 603 to {BSSb, Db1); t1, and adds an entry {BSSa, Da−t1+t0} to a child node 607 of the BSS record 603, as illustrated in FIG. 6C, in an embodiment.

With continued reference to FIGS. 5 and 6, when the client station receives the CF-end data unit 508 at the time t3, the client station 25-1 determines whether the BSS indicated in the entry in the root node 605 of the BSS record 603 corresponds to the BSS indicated in the CF-end data unit 508 (BSSb). If the client station 25-1 determined that the BSS indicated in the entry in the root node 605 of the BSS record 603 does not correspond to the BSS indicated in the CF-end data unit 508, then the client station 25-1 searches the BSS record 603 to find an entry corresponding to the BSS indicated in the CF-end data unit 508 and, if such entry is found, the client station 25-1 deletes this entry from the BS record 603, in an embodiment. If, on the other hand, the client station 25-1 determined that the BSS indicated in the entry in the root node 605 of the BSS record 603 corresponds to the BSS indicated in the CF-end data unit 508, then the client station 25-1 deletes the entry at the root node 605. Also, the client station 25-1 determines based on the duration value indicated in the entry in the child node 607-1 of the BSS record 603 whether the contention free period is still on-going in the BSSa, in an embodiment. For example, the client station 25-1 determines whether Da1−t2+t0 is greater than zero. If the client station 25-1 determines that Da1−t2+t0 is greater than zero, then the client station 25-1 records the entry {(BSSa, Da1−t2+t0); t2} in the root node 605 of the BSS record 603 and deletes the entry corresponding to the BSSa from, in an embodiment. In this case, the client station 25-1 resets the NAV timer to the value Da1−t2+t0, in an embodiment. On the other hand, if the client station 25-1 determines that Da1−t2+t0 is less than or equal to zero, then the client station 25-1 records the entry deletes the entry corresponding to BSSa from the BSS record 603. In this case, the client station 25-1 resets the NAV timer to zero, in an embodiment.

In some embodiments, BSS records having suitable formats different from the format of the BSS record 503 of FIG. 3 or the BSS record 603 are used. For example, a BSS record having a Min-Heap data structure similar to the BSS record 603 is used except that the entries of the min heap structure have a format of {BSS, NAVoffset} as described above with respect to the BSS record 503, in an embodiment. In other embodiments, BSS records have formats of other suitable data structures, such as a Max-Heap data structure, a linear data structure, a hash table structure, etc., with entries formatted as (i) {BSS, NAVoffset}, as described above with respect to the BSS record 503 or (ii) {(BSS, NAVoffset); t} for the root node, and {BSS, Duration} for non-root nodes, as described above with respect to the BSS record 603.

In some embodiments, when the client station 25-1 receives a data unit that is not addressed to the client station 25-1, the client station 25-1 measures an energy level of the data unit and compares the measured energy level to a threshold. In an embodiment, if the measured energy level is below the threshold, then the client station 25-1 disregards the data unit. On the other hand, if the measured energy level is greater than or equal to the threshold, then the client station 25-1 implements a procedure to reset NAV and/or update BSS record such as the procedure 500 or another suitable procedure, in an embodiment. In some embodiments, different threshold levels are defined for data units corresponding to the BSS in which the client station 25-1 and for data units corresponding to other BSSs (OBSSs). In such embodiments, when the client station receives a data unit, the client station 25-1 utilizes a measured energy level in the data unit and a determination of the BSS to which the data unit corresponds to determine whether a procedure to reset NAV and/or update BSS record such as the procedure 500 should be performed.

Figure 7:
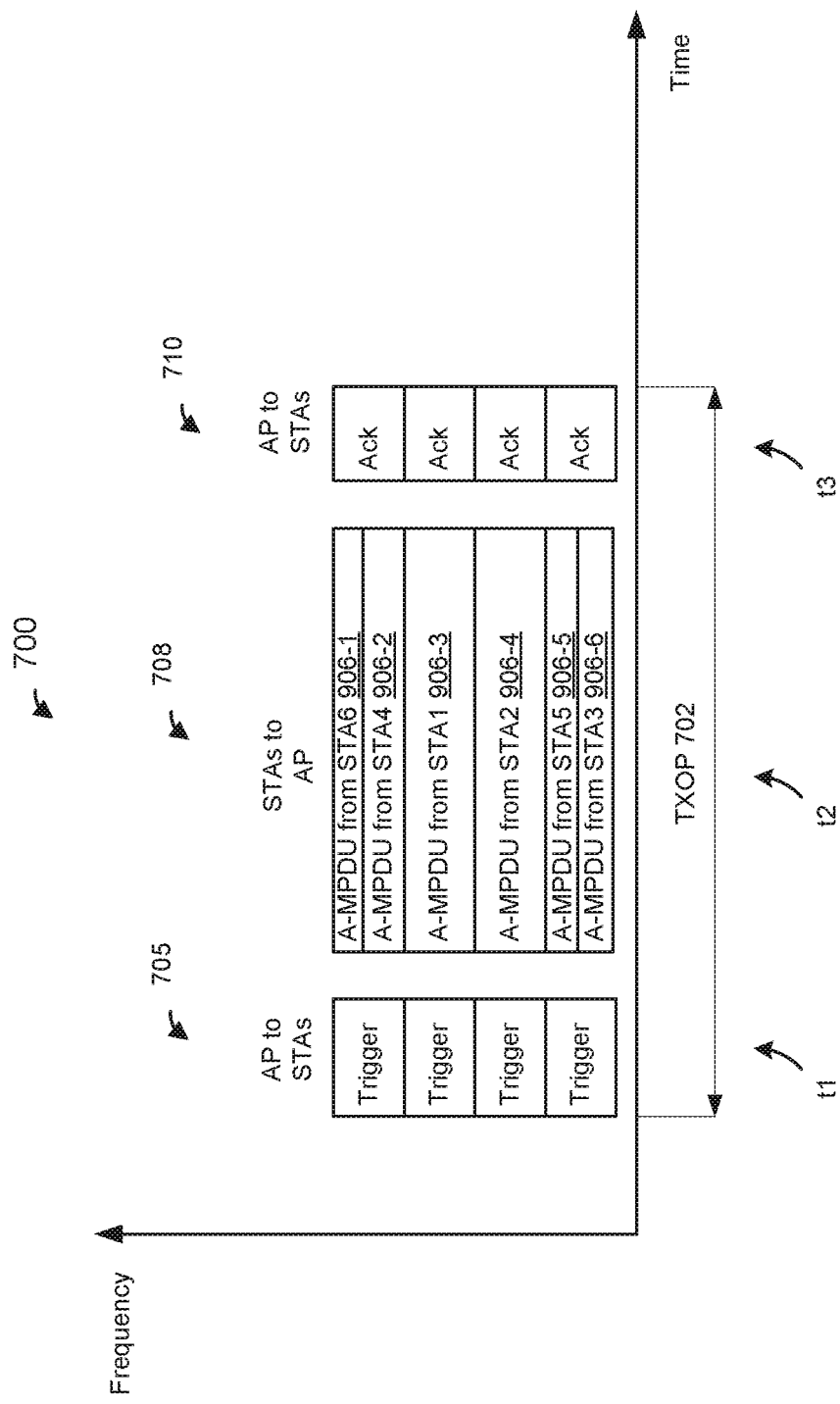
FIG. 7 is a diagram of an example frame exchange during a transmission opportunity (TXOP), according to an embodiment.

FIG. 7 is a diagram of an example transmission sequence 700 in a WLAN, such as the WLAN 10 of FIG. 1, according to an embodiment, in which an AP, such as the AP 14, triggers a UL OFDMA transmission by multiple client stations, such as multiple ones of the client stations 25, during a transmission opportunity period (TXOP) 402. During a time t1, the AP 14 transmits a trigger frame 704 to a plurality of client stations 25. In an embodiment, the time t1 begins at the beginning of a TXOP obtained by (e.g., based on a suitable channel assessment procedure, such as a carrier sense multiple access with collision avoidance (CSMA/CA) procedure, a backoff procedure, etc.), or scheduled for, the AP 14. In an embodiment, the trigger frame 704 provides, to the plurality of client stations 25, resource unit allocation indications and other transmission parameters to be used for transmission of an uplink OFDMA data unit during the TXOP 402. In an embodiment, the trigger frame 704 is a MAC control frame that includes the uplink transmission information. In an embodiment, the MAC control frame is included in a data portion a data unit, such as the data portion 250 of the data unit 200 of FIG. 2. In an embodiment, the trigger frame 704 is included in a physical layer convergence protocol (PLCP) protocol data unit (PPDU), such as a legacy PPDU that conforms to the IEEE 802.11a or IEEE 802.11g Standard, for example. In another embodiment, the trigger frame 704 is a null data packet (NDP) that includes uplink transmission information in a preamble, and omits a data portion. In an embodiment and/or scenario, the trigger frame 704 is duplicated in each channel (e.g., in each 20 MHz channel) of the entire bandwidth of the TXOP 702. In an embodiment in which the trigger frame 704 is included in a legacy PPDU which is duplicated each channel (e.g., in each 20 MHz channel) of the entire bandwidth of the TXOP 702, communication medium is protected from interference by any device in the network over the entire bandwidth of the TXOP 402, at least for the duration defined by a Duration field of the trigger frame 704, or for the duration of the entire TXOP 702. In another embodiment and/or scenario, the trigger frame 704 occupies the entire bandwidth of the TXOP 702, for example when each of the client stations 25 to which the trigger frame 704 is transmitted is capable of operating in the entire bandwidth of the TXOP 702. In an embodiment, a trigger frame that occupies the entire bandwidth of the TXOP 702 is relatively shorter, and accordingly is transmitted in a relatively shorter time period, compared to a trigger frame that is duplicated in each narrowest channel bandwidth of the TXOP 702.

The trigger frame 704 indicates respective subchannels allocated for uplink OFDMA transmission by six client stations STA1 through STA6, in the illustrated embodiment. During a time t2, client stations STA1 through STA6 transmit respective OFDM data unit, such as an A-MPDUs, 706 as parts of an OFDMA transmission 708 to the AP 14. In an embodiment, each A-MPDU 706 is included in a physical layer data unit transmitted by a corresponding client station 25. In an embodiment, the OFDMA transmission 708 has a format the same as or similar to the format of the data unit 200 of FIG. 2. In another embodiment, the OFDMA transmission 708 has a suitable format different from the format of the data unit 200 of FIG. 2.

In an embodiment, each client station transmits its OFDM data unit 706 during the time t2 in a respective subchannel, allocated to the client station, as indicated in the trigger frame 704. In an embodiment, each client station transmits its OFDM data unit using transmission parameters, such as a modulation and coding scheme, a coding type, transmission power, length or duration of the data unit, etc. indicated in the trigger frame 704. In another embodiment, at least some of the client stations transmit OFDM data unit using at least some transmission parameters, such as a modulation and coding scheme, a coding type, transmission power, length or duration of the data unit, etc. determined by the client stations and not indicated in the trigger frame 704.

During a time t3, the AP 14 transmits respective acknowledgement (ACK) frames 710 to the client stations 25 (STA1 through STA6) acknowledging receipt of the OFDM data units 706 from the client stations 25. In another embodiment, the AP 14 transmits a broadcast acknowledgement frame that includes respective acknowledgements for the client stations 25 (STA1 through STA6). Time t3 begins upon expiration of a predetermined time interval, such as for example a time interval corresponding to a short inter-frame space (SIFS), after completion of reception of the OFDM data units 706 at the AP 14, in an embodiment. In an embodiment, the AP 14 transmits the ACK frame 710 to the client stations 25, as parts of an OFDMA transmission to the client statins 25, in the respective subchannels allocated to the client stations 25 indicated in the trigger frame 704.

In an embodiment, when a station (e.g., client station 25-1) receives the trigger frame 704 at the time t1, the client station 25-1 checks its NAV timer to determine whether the current value of the NAV timer is zero. In an embodiment, if the client station 25-1 determines that the current value of the NAV timer at the time t1 is zero, then the station utilizes a suitable channel access procedure for accessing the medium for transmission of its uplink data unit 706 triggered by the trigger frame 704. On the other hand, if the station determines that the current value of the NAV timer at the time t1 is greater than zero, then the station checks its BSS record to identify entries corresponding BSSs with on-going contention free periods, in an embodiment. For example, if the client station 25-1 maintains a BSS record having the format of the BSS record 503 of FIG. 5, the client station 25-1 identifies entries in which NAVtimer−|NAVoffset| is greater than zero, in an embodiment. As another example, if the client station 25-1 maintains a BSS record having the format of the BSS record 603 of FIG. 6, the client station 25-1 identifies entries in which the difference between the indicated duration and the current value of the NAVtimer is greater than zero, in an embodiment. If the client station 25-1 identifies only one entry corresponding a BSS with on-going contention free periods, the client station 25-1 determines whether the one entry corresponds to the BSS with which the client station 25-1 is associated, then the client station transmits its uplink data unit 706 even though the NAV timer is not zero, in an embodiment.

On the other hand, if at least one of the identified entries corresponds to a BSS other than the BSS in which the client station 25-1 is operating (e.g., an OBSS), the client station 25-1 refrains from transmitting an uplink data unit, in an embodiment. In another embodiment, if at least one of the identified entries corresponds to an OBSS, the client station 25-1 transmits a short data unit, such as a data unit having a length of an ACK frame, in the subchannel allocated to the client station 25-1. In some such embodiments, the client station 25-1 includes in the short data unit, a channel status report to report results of channel sensing to the AP 14. The AP 14 utilizes the channel status report received from client station 25-1 for scheduling and subchannel allocation for uplink triggering subsequent transmissions by the client station 25-1, in an embodiment.

In another embodiment, if at least one of the identified entries corresponds to an OBSS, the client station 25-1 performs a clear channel assessment (CCA) procedure in the subchannel allocated to the client station 25-1 for uplink transmission to the client station 25-1, e.g., as indicated in the trigger frame 704. If the client station 25-1 determines based on the CCA procedure that the subchannel allocated to the client station 25-1 is idle, then the client station transmits its uplink data unit 706 in the subchannel allocated to the client station 25-1, in an embodiment. On the other hand, if the client station 25-1 determines based on the CCA procedure that the subchannel allocated to the client station 25-1 is busy, then the client station 25-1 refrains from transmitting in the subchannel allocated to the client station 25-1, or transmits a short uplink data unit in the subchannel allocated to the client station 25-1 as described above, in various embodiments.

In an embodiment, the BSS in which a client station (e.g., the client station 25-1) is operating supports a mode in which a client station "camps" on a sub-channel of the BSS. For example, the client station may camp on a 20 MHz subchannel of a BSS that operates with an 80 MHz bandwidth, in an embodiment. The "camp" subchannel of a client station need not necessarily be the primary subchannel of the BSS, in an embodiment. For example, a client station may camp on a non-primary 20 MHz subchannel of a BSS that operates with an 80 MHz bandwidth, in an embodiment. In an embodiment, the AP of the BSS is configured to communicate control and management information to the client station on the camp subchannel of the client station. For example, the AP is configured to transmit management and/or control frames to the client station on the camp channel of the client station. In an embodiment, a client station and an AP negotiate the particular camp channel to be used by the client station. For example, camp channel negotiation is performed during an association procedure between the AP and the client station, in an embodiment In some embodiments, the client station 25-1 receives its trigger frame 704 in the camp channel of the client station 25-1. The client station 25-1 then utilizes channel access rules described above to determine whether the client station 25-1 should refrain from transmitting in the camp channel or transmit only a short data unit in the camp channel, in an embodiment. In an embodiment, the client station 25-1 maintains a NAV timer and a BSS record corresponding to only the camp channel of the client station 25-1, and determines whether the client station 25-1 should refrain from transmitting in the camp channel or transmit only a short data unit in the camp channel based on the value of the NAV timer and the BSS record corresponding to the camp channel of the client station 25-1.

In some embodiments, a client station (e.g., the client station 25-1) maintains respective NAV timers and corresponding respective BSS records for each of multiple subchannels of the BSS in which the client station is operating. For example, the client station maintains respective NAV timers and corresponding respective BSS records for each of four 20 MHz subchannels of a BSS operating with an 80 MHz bandwidth. In an embodiment, when the client station receives the trigger frame 704, the client station determines, one or more of the respective NAV timers and the one or more BSS records corresponding to the subchannels that include the subchannel allocated for uplink transmission by the client station, whether the client station can transmit its uplink data unit in the subchannel allocated to the client station or should reframing from transmission or transmit only a short data in the subchannel allocated to the client station as described above.

Figure 8:
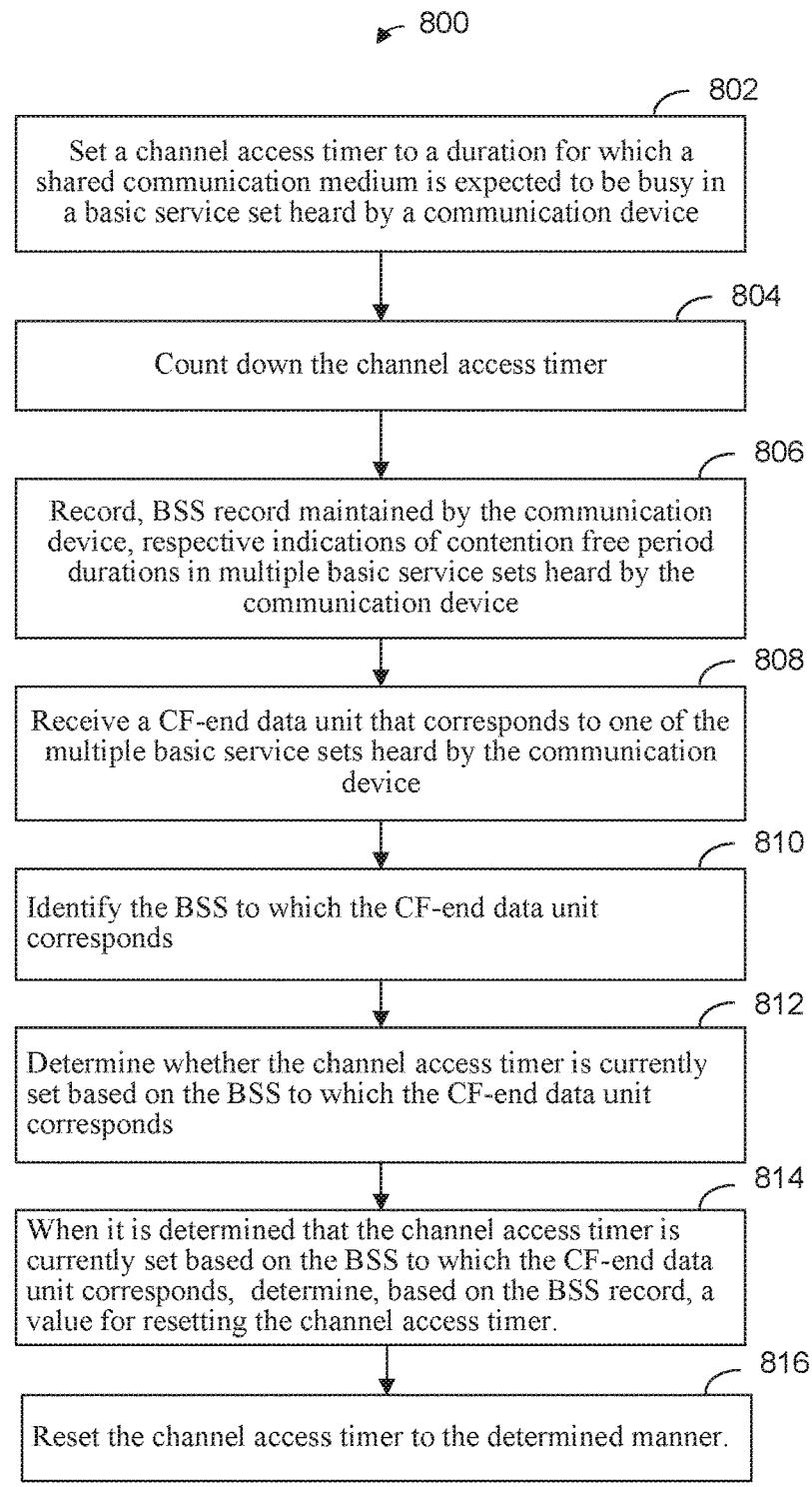
FIG. 8 is a flow diagram of an example method for protecting a shared communication medium from transmissions by a communication device, according an embodiment.

FIG. 8 is a flow diagram of an example method 800 for protecting a shared communication medium from transmissions by a communication device, according an embodiment. In an embodiment, the method 800 is implemented by an AP (e.g., an AP 14 of FIG. 1). In another embodiment, the method 800 is implemented by a client station (e.g., a client station 25 of FIG. 1). In still another embodiment, the method 800 is implemented by both an AP (e.g., an AP 14) and a client station (e.g., a client station 25). For example, in some embodiments, the network interface device 16 and/or 27 is configured to implement the method 800. As another example, in some embodiments, the host processor 15 is configured to implement at least a portion of the method 800. As another example, in some embodiments, the host processor 15 and/or 26 and the network interface device 16 and/or 27 are configured to implement the method 800. As yet another example, in some embodiments, the MAC processors 18 and/or 28 is configured to implement portions of the method 800, and the PHY processors 20 and/or 29 are configured to implement other portions of the method 800. In other embodiments, another suitable communication device is configured to implement the method 800.

At block 802, a channel access timer is set to a duration for which the shared communication medium is expected to be busy in a BSS heard by the communication device. For example, in an embodiment, the channel access timer is set based on a duration indicated in a data unit that is received by the communication device but that is addressed to another communication device. In an embodiment, the channel access timer is set based on a duration indication included in a signal field of the preamble 202 of FIG. 2. In an embodiment, the channel access timer is set based on a duration indication in the duration subfield 402-4 of FIG. 4. In another embodiment, the channel access timer is set based on a duration indication in the Duration/ID subfield 306 of the MAV header 302 of FIG. 3. In other embodiments, the channel access timer is set based on another suitable duration indication included in a data unit, or is set in a suitable manner other than based on a duration indication not included in a data unit.

At block 804, the channel access timer is continually counted down from the value set at block 802, in an embodiment. Blocks 806-814 are performed before the channel access timer reaches zero, in an embodiment. In another embodiment, at least some of the blocks 806-814 are performed when or after the channel access timer reaches zero.

At block 806, respective indications of contention free durations in multiple BSSs heard by the communication device are recorded in a BSS record maintained by the communication device. In an embodiment, the respective indications are recorded in the BSS record 503 as described above with respect to FIG. 5. In another embodiment, the respective indications are recorded in the BSS record 603 as described above with respect to FIGS. 6A-6C. In other embodiments, the respective indications are recorded in BSS records different from the BSS record 503 or the BSS record 603 and/or are recorded in suitable manners different from the manners described above with respect to FIG. 5 or FIGS. 6A-6C.

At block 808, a CF-end data unit is received. In an embodiment, the CF-end data unit 508 of FIG. 5 is received. In another embodiment, a suitable CF-end data unit different from the CF-end data unit of FIG. 5 is received. In an embodiment, the CF-end data unit indicates an end of a contention free period in one of the multiple BSSs heard by the communication device.

At block 810, the BSS to which the CF-end data unit corresponds is identified by the communication device. In an embodiment, the BSS is identified based on a BSS color subfield of a signal field of the CF-end data unit. In another embodiment, the BSS is identified based on an address field of a MAC header of the CF-end data unit. In other embodiments, the BSS is identified based on another indication included on the CF-end data unit, or is determined in a suitable manner other than based on an indication included in the CF-end data unit.

At block 812, it is determined whether the channel access timer of the communication device is currently set based on the BSS to which the CF-end data unit corresponds. At block 814, when it is determined that the channel access timer of the communication device is set based on the BSS to which the CF-end data unit corresponds, a value for resetting the BSS timer is determined. In an embodiment, the value for resetting the channel access timer is determined based on the BSS record maintained by the communication device. For example, in an embodiment, the value for resetting the channel access timer is determined based on the BSS record 503 as described above with respect to FIG. 5. In another embodiment, the value for resetting the channel access timer is determined based on the BSS record 603 as described above with respect to FIGS. 6A-6C. In other embodiments, the value for resetting the channel access timer is determined based on BSS records different from the BSS record 503 or the BSS record 603 and/or are determined in suitable manners different from the manners described above with respect to FIG. 5 or FIGS. 6A-6C. At block 816, the channel access timer is reset to the value determined a block 816.

Figure 9:
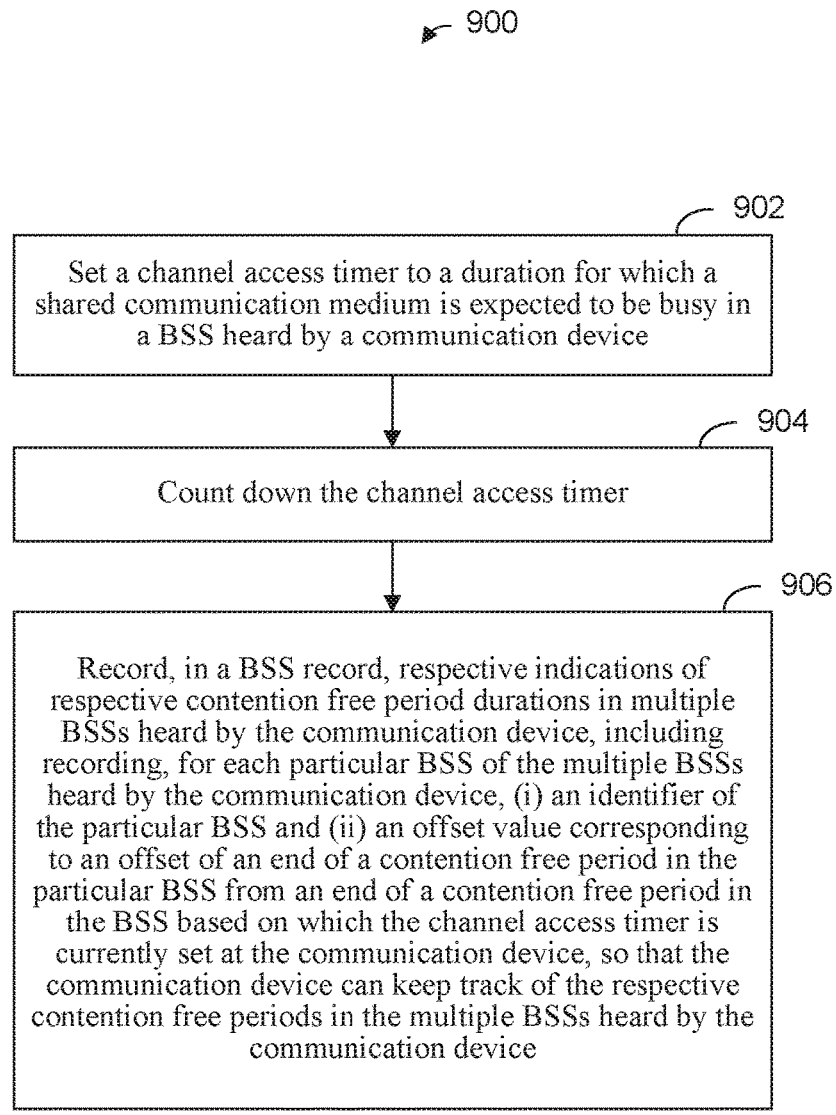
FIG. 9 is a flow diagram of another example method for protecting a shared communication medium from transmissions by a communication device, according another embodiment.

FIG. 9 is a flow diagram of an example method 900 for protecting a shared communication medium from transmissions by a communication device, according an embodiment. In an embodiment, the method 900 is implemented by an AP (e.g., an AP 14 of FIG. 1). In another embodiment, the method 900 is implemented by a client station (e.g., a client station 25 of FIG. 1). In still another embodiment, the method 900 is implemented by both an AP (e.g., an AP 14) and a client station (e.g., a client station 25). For example, in some embodiments, the network interface device 16 and/or 27 is configured to implement the method 900. As another example, in some embodiments, the host processor 15 is configured to implement at least a portion of the method 900. As another example, in some embodiments, the host processor 15 and/or 26 and the network interface device 16 and/or 27 are configured to implement the method 900. As yet another example, in some embodiments, the MAC processors 18 and/or 28 is configured to implement portions of the method 900, and the PHY processors 20 and/or 29 are configured to implement other portions of the method 900. In other embodiments, another suitable communication device is configured to implement the method 900.

At block 902, a channel access timer is set to a duration for which the shared communication medium is expected to be busy in a BSS heard by the communication device. For example, in an embodiment, the channel access timer is set based on a duration indicated in a data unit that is received by the communication device but that is addressed to another communication device. In an embodiment, the channel access timer is set based on a duration indication included in a signal field of the preamble 202 of FIG. 2. In an embodiment, the channel access timer is set based on a duration indication in the duration subfield 402-4 of FIG. 4. In another embodiment, the channel access timer is set based on a duration indication in the Duration/ID subfield 306 of the MAV header 302 of FIG. 3. In other embodiments, the channel access timer is set based on another suitable duration indication included in a data unit, or is set in a suitable manner other than based on a duration indication not included in a data unit.

At block 904, the channel access timer is continually counted down from the value set at block 902, in an embodiment.

At block 906, before the channel access timer reaches zero, respective indications of contention free durations in multiple BSSs heard by the communication device are recorded in a BSS record maintained by the communication device. The respective indications are recorded so that the communication device can keep track of the respective contention free periods in the multiple BSSs heard by the communication device. In an embodiment, recording the respective indications at block 906 includes, recording, for each particular BSS of the multiple BSSs heard by the communication device, (i) an identifier of the particular BSS and (ii) an offset value corresponding to an offset of an end of a contention free period in the particular BSS from an end of a contention free period in the BSS based on which the channel access timer is currently set at the communication device, so that the communication device can keep track of the respective contention free periods in the multiple BSSs heard by the communication device.

In an embodiment, the respective indications are recorded at block 906 in the BSS record 503 as described above with respect to FIG. 5. In another embodiment, the respective indications are recorded at block 906 in the BSS record 603 as described above with respect to FIGS. 6A-6C. In other embodiments, the respective indications are recorded at block 906 in BSS records different from the BSS record 503 or the BSS record 603 and/or are recorded in suitable manners different from the manners described above with respect to FIG. 5 or FIGS. 6A-6C.

In an embodiment, a method for protecting transmissions in a shared communication medium includes setting, at a communication device, a channel access timer to a duration for which a shared communication medium is expected to be busy in a basic service set (BSS) heard by the communication device. The method also includes counting down, with the communication device, the channel access timer. The method additionally includes before the channel access timer reaches zero, recording, with the communication device in a BSS record maintained by the communication device, respective indications of respective contention free period durations in multiple basic service sets (BSSs) heard by the communication device, including recording, for each particular BSS of the multiple BSSs heard by the communication device, (i) an identifier of the particular BSS and (ii) an offset value corresponding to an offset of an end of a contention free period in the particular BSS from an end of a contention free period in the BSS based on which the channel access timer is currently set at the communication device, so that the communication device can keep track of the respective contention free periods in the multiple BSSs heard by the communication device.

In other embodiments, the method includes any suitable combination of one or more of the following features.

Setting the channel access timer comprises setting the channel access timer based on a duration indication included in a data unit that (i) is received by the communication device and (ii) is addressed to another communication device.

The identifier of the particular BSS is a BSS color obtained from a signal field of a preamble of a data unit corresponding to the particular BSS, wherein the data unit (i) is received by the communication device and (ii) is addressed to another communication device.

The BSS record comprises one of (i) a linear data structure, (ii) a min heap data structure or (iii) a max heap data structure.

The method further comprises, before the channel access timer reaches zero: receiving, at the communication device, a data unit; determining, with the communication based on (i) a duration indication included in the data unit and (ii) a current value of the channel access timer, whether the channel access timer should be reset based on the duration indication in the data unit; and when it is determined that the channel access timer should be reset to a new value, resetting, with the communication device, the channel access timer based on the duration indicated in the data unit, and updating, with the communication device, offset values in the BSS record to indicate offsets with respect to the channel access timer reset based on the duration indicated in the data unit.

The method further comprises, before the channel access timer reaches zero: receiving, at the communication device, a contention free end (CF-end) data unit; identifying, at the communication device, a BSS to which the CF-end data unit corresponds; determining, at the communication device, whether the channel access timer is currently set based on the BSS to which the CF-end data unit corresponds; and when it is determined that the channel access timer is currently set based on the BSS to which the CF-end data unit corresponds, determining, with the communication device based on the BSS record, a value for resetting the channel access timer, and resetting, with the communication device, the channel access timer to the determined value.

The method further comprises, when it is determined that the channel access timer is currently not set based on the BSS to which the CF-end data unit corresponds, deleting, with the communication device, a corresponding entry from the BSS record.

The method further comprises, before the channel access timer reaches zero receiving, at the communication device, a trigger data unit to trigger an uplink transmission by the communication device, and determining, with the communication device based on the BSS record, whether the communication device is to refrain from transmitting the uplink transmission triggered by the trigger data unit.

The communication device is associated with a particular BSS.

Determining whether the communication device is to refrain from transmitting the triggered uplink transmission includes determining whether the BSS record indicates on-going contention free periods in one or more BSSs other than the particular BSS with which the communication device is associated.

The method further comprises, in response to determining that the BSS record indicates an on-going contention free period in only the BSS with which the communication device is associated, transmitting, with the communication device, the uplink transmission triggered by the trigger data unit.

In another embodiment, a communication device comprises a network interface having one or more integrated circuits configured to set a channel access timer to a duration for which a shared communication medium is expected to be busy in a basic service set (BSS) heard by the communication device. The one or more integrated circuits are also configured to count down the channel access timer, and, before the channel access timer reaches zero, record, in a BSS record maintained by the communication device, respective indications of respective contention free period durations in multiple basic service sets (BSSs) heard by the communication device, including recording, for each particular BSS of the multiple BSSs heard by the communication device, (i) an identifier of the particular BSS and (ii) an offset value corresponding to an offset of an end of a contention free period in the particular BSS from an end of a contention free period in the BSS based on which the channel access timer is currently set at the communication device, so that the communication device can keep track of the respective contention free periods in the multiple BSSs heard by the communication device.

In other embodiments, the communication device includes any suitable combination of one or more of the following features.

The one or more integrated circuits are configured to set the channel access timer based on a duration indication included in a data unit that (i) is received by the communication device and (ii) is addressed to another communication device.

The identifier of the particular BSS is a BSS color obtained from a signal field of a preamble of a data unit corresponding to the particular BSS, wherein the data unit (i) is received by the communication device and (ii) is addressed to another communication device.

The BSS record comprises one of (i) a linear data structure, (ii) a min heap data structure or (iii) a max heap data structure.

The one or more integrated circuits are further configured to, before the channel access timer reaches zero: receive, a data unit; determine, with the communication device based on (i) a duration indication included in the data unit and (ii) a current value of the channel access timer, whether the channel access timer should be reset based on the duration indication in the data unit, and when it is determined that the channel access timer should be reset to a new value, reset the channel access timer based on the duration indicated in the data unit, and update offset values in the BSS record to indicate offsets with respect to the channel access timer reset based on the duration indicated in the data unit.

The one or more integrated circuits are further configured to, before the channel access timer reaches zero: receive a contention free end (CF-end) data unit; identify a BSS to which the CF-end data unit corresponds; determine, whether the channel access timer is currently set based on the BSS to which the CF-end data unit corresponds; and when it is determined that the channel access timer is currently set based on the BSS to which the CF-end data unit corresponds, determine, based on the BSS record, a value for resetting the channel access timer, and reset the channel access timer to the determined value.

The one or more integrated circuits are further configured to, when it is determined that the channel access timer is currently not set based on the BSS to which the CF-end data unit corresponds, delete a corresponding entry from the BSS record.

The one or more integrated circuits are further configured to, before the channel access timer reaches zero, receive a trigger data unit to trigger an uplink transmission by the communication device, and determine, based on the BSS record, whether the communication device is to refrain from transmitting the uplink transmission triggered by the trigger data unit.

The communication device is associated with a particular BSS.

The one or more integrated circuits are configured to determine whether the communication device is to refrain from transmitting the triggered uplink transmission at least by determining whether the BSS record indicates on-going contention free periods in one or more BSSs other than the particular BSS with which the communication device is associated.

The one or more integrated circuits are further configured to, in response to determining that the BSS record indicates an on-going contention free period in only the BSS with which the communication device is associated, the uplink transmission triggered by the trigger data unit.

In yet another embodiment, a method for protecting transmissions in a shared communication medium, the method includes setting, at a communication device, a channel access timer to a duration for which a shared communication medium is expected to be busy in a basic service set heard by the communication device. The method also includes counting down the channel access timer, and before the channel access timer reaches zero: recording, with the communication device in a basic service set (BSS) record maintained by the communication device, respective indications of contention free period durations in multiple basic service sets heard by the communication device; receiving, at the communication device, a contention free end (CF-end) data unit that corresponds to one of the multiple basic service sets (BSSs) heard by the communication device, wherein the CF-end data unit serves as an indication of an end of a contention free period in the one of the multiple basic service sets heard by the communication device; identifying, at the communication device, the BSS to which the CF-end data unit corresponds; determining, at the communication device, whether the channel access timer is currently set based on the BSS to which the CF-end data unit corresponds; and when it is determined that the channel access timer is currently set based on the BSS to which the CF-end data unit corresponds, determining, with the communication device based on the BSS record, a value for resetting the channel access timer, and resetting, with the communication device, the channel access timer to the determined value.

In other embodiments, the method includes any suitable combination of one or more of the following features.

Setting the channel access timer comprises setting the channel access timer based on a duration indication included in a data unit that (i) is received by the communication device and (ii) is addressed to another communication device.

Recording, in the BSS record, a particular one of the respective indications corresponding to a particular BSS of the multiple BSSs heard by the communication device comprises recording (i) an identifier of the particular BSS and (ii) an offset value corresponding to an offset of an end of a contention free period in the particular BSS from an end of a contention free period in a BSS based on which the channel access timer is currently set at the communication device.

The identifier of the particular BSS is a BSS color obtained from a signal field of a preamble of a data unit that (i) is received by the communication device and (ii) is addressed to another communication device.

The BSS record comprises one of (i) a linear data structure, (ii) a min heap data structure or (iii) a max heap data structure.

The method further includes, when it is determined that the channel access timer is currently not set based on the BSS to which the CF-end data unit corresponds, deleting, with the communication device, a corresponding entry from the BSS record.

The method further includes, before the channel access timer reaches zero: receiving, at the communication device, a trigger data unit to trigger an uplink transmission by the communication device, and determining, with the communication device based on the BSS record, whether the communication device is to refrain from transmitting the uplink transmission triggered by the trigger data unit.

The communication device is associated with a particular BSS.

Determining whether the communication device is to refrain from transmitting the triggered uplink transmission includes determining whether the BSS record indicates on-going contention free periods in one or more BSSs other than the particular BSS with which the communication device is associated.

The method further includes in response to determining that the BSS record indicates an on-going contention free period in only the BSS with which the communication device is associated, transmitting, with the communication device, the uplink transmission triggered by the data unit.

In still another embodiment, a communication device comprises a network interface having one or more integrated circuits configured to set a channel access timer to a duration for which a shared communication medium is expected to be busy in a basic service set heard by the communication device. The one or more integrated circuits are also configured to count down the channel access timer, and before the channel access timer reaches zero: record, in a basic service set (BSS) record maintained by the communication device, respective indications of contention free period durations in multiple basic service sets heard by the communication device; receive a contention free end (CF-end) data unit that corresponds to one of the multiple basic service sets (BSSs) heard by the communication device, wherein the CF-end data unit serves as an indication of an end of a contention free period in the one of the multiple basic service sets heard by the communication device: identify the BSS to which the CF-end data unit corresponds; determine whether the channel access timer is currently set based on the BSS to which the CF-end data unit corresponds; and when it is determined that the channel access timer is currently set based on the BSS to which the CF-end data unit corresponds, determine, based on the BSS record, a value for resetting the channel access timer, and reset the channel access timer to the determined value.

In other embodiments, the communication device includes any suitable combination of one or more of the following features.

The one or more integrated circuits are configured to set the channel access timer based on a duration indication included in a data unit that (i) is received by the communication device and (ii) is addressed to another communication device.

The one or more integrated circuits are configured record, in the BSS record, a particular one of the respective indications corresponding to a particular BSS of the multiple BSSs heard by the communication device at least by recording, in the BSS record, (i) an identifier of the particular BSS and (ii) an offset value corresponding to an offset of an end of a contention free period in the particular BSS from an end of a contention free period in a BSS based on which the channel access timer is currently set at the communication device.

The identifier of the particular BSS is a BSS color obtained from a signal field of a preamble of a data unit that (i) is received by the communication device and (ii) is addressed to another communication device.

The BSS record comprises one of (i) a linear data structure, (ii) a min heap data structure or (iii) a max heap data structure.

The one or more integrated circuits are further configured to, when it is determined that the channel access timer is currently not set based on the BSS to which the CF-end data unit corresponds, delete a corresponding entry from the BSS record.

The one or more integrated circuits are further configured to, before the channel access timer reaches zero receive a trigger data unit to trigger an uplink transmission by the communication device, and determine, based on the BSS record, whether the communication device is to refrain from transmitting the uplink transmission triggered by the trigger data unit.

The one or more integrated circuits are further configured to determine whether the communication device is to refrain from transmitting the uplink transmission triggered by the trigger unit based on a determination of whether the BSS record indicates an on-going contention free periods in one or more BSSs other than the particular BSS with which the communication device is associated.

The one or more integrated circuits are further configured to, in response to determining that the BSS record indicates an on-going contention free period in only the BSS with which the communication device is associated, transmit the uplink transmission triggered by the trigger data unit.

At least some of the various blocks, operations, and techniques described above may be implemented utilizing hardware, a processor executing firmware instructions, a processor executing software instructions, or any combination thereof. Examples of suitable hardware include a microprocessor, microcontroller, one or more integrated circuits, one or more application specific integrated circuits (ASICs), one or more field programmable gate arrays, one or more programmable logic devices, etc. When implemented utilizing a processor executing software or firmware instructions, the software or firmware instructions may be stored on a computer readable medium, or media, such as a magnetic disk, an optical disk, a random access memory (RAM), a read only memory (ROM), a flash memory, a magnetic tape, etc. The software or firmware instructions may include machine readable instructions that, when executed by one or more processors, cause the one or more processors to perform various acts.

When implemented in hardware, the hardware may comprise one or more of i) discrete components, ii) one or more integrated circuits, iii) one or more ASICs, iv) one or more programmable logic devices, etc.

While the present disclosure has been described with reference to specific examples, which are intended to be illustrative only and not to be limiting of the invention, changes, additions and/or deletions may be made to the disclosed embodiments without departing from the scope of the claims.

What is claimed is:

1. A method for protecting transmissions in a shared communication medium, the method comprising:
   setting, at a communication device, a channel access timer to a duration for which a shared communication medium is expected to be busy in a basic service set (BSS) heard by the communication device;
   counting down, with the communication device, the channel access timer; and
   before the channel access timer reaches zero
      recording, with the communication device in a BSS record maintained by the communication device, respective indications of respective contention free period durations in multiple basic service sets (BSSs) heard by the communication device, including recording, for each particular BSS of the multiple BSSs heard by the communication device, (i) an identifier of the particular BSS and (ii) a time offset value indicating a time difference between an end of a contention free period in the particular BSS and an end of a contention free period in the BSS based on which the channel access timer is currently set at the communication device, so that the communication device can keep track of the respective contention free periods in the multiple BSSs heard by the communication device,
      receiving, at the communication device, a data unit,
      determining, with the communication device based on a comparison of (i) a duration indication included in the data unit and (ii) a current value of the channel access timer, whether the channel access timer should be reset, and
      when it is determined that the duration indicated in the data unit is greater than the current value of the channel access timer,
         resetting, with the communication device, the channel access timer based on the duration indicated in the data unit, and
         updating, with the communication device, time offset values in the BSS record to indicate offsets with respect to the channel access timer, reset based on the duration indicated in the data unit.

2. The method of claim 1, wherein setting the channel access timer comprises setting the channel access timer based on a duration indication included in a data unit that (i) is received by the communication device and (ii) is addressed to another communication device.

3. The method of claim 1, wherein the identifier of the particular BSS is a BSS color obtained from a signal field of a preamble of a data unit corresponding to the particular BSS, wherein the data unit (i) is received by the communication device and (ii) is addressed to another communication device.

4. The method of claim 1, wherein the BSS record comprises one of (i) a linear data structure, (ii) a min heap data structure or (iii) a max heap data structure.

5. The method of claim 1, further comprising, before the channel access timer reaches zero,
   receiving, at the communication device, a contention free end (CF-end) data unit;
   identifying, at the communication device, a BSS to which the CF-end data unit corresponds;
   determining, at the communication device, whether the channel access timer is currently set based on the BSS to which the CF-end data unit corresponds; and
   when it is determined that the channel access timer is currently set based on the BSS to which the CF-end data unit corresponds,
      determining, with the communication device based on the BSS record, a value for resetting the channel access timer, and
      resetting, with the communication device, the channel access timer to the determined value.

6. The method of claim 5, further comprising, when it is determined that the channel access timer is currently not set based on the BSS to which the CF-end data unit corresponds, deleting, with the communication device, a corresponding entry from the BSS record.

7. The method of claim 1, further comprising, before the channel access timer reaches zero
   receiving, at the communication device, a trigger data unit to trigger an uplink transmission by the communication device, and
   determining, with the communication device based on the BSS record, whether the communication device is to refrain from transmitting the uplink transmission triggered by the trigger data unit.

8. The method of claim 7, wherein the communication device is associated with a particular BSS, and wherein determining whether the communication device is to refrain from transmitting the uplink transmission includes determining whether the BSS record indicates on-going contention free periods in one or more BSSs other than the particular BSS with which the communication device is associated.

9. The method of claim 8, further comprising in response to determining that the BSS record indicates an on-going contention free period in only the BSS with which the communication device is associated, transmitting, with the communication device, the uplink transmission triggered by the trigger data unit.

10. A communication device, comprising:
    a network interface having one or more integrated circuits configured to set a channel access timer to a duration for which a shared communication medium is expected to be busy in a basic service set (BSS) heard by the communication device; count down the channel access timer; and
    before the channel access timer reaches zero
       record, in a BSS record maintained by the communication device, respective indications of respective contention free period durations in multiple basic service sets (BSSs) heard by the communication device, including recording, for each particular BSS of the multiple BSSs heard by the communication device, (i) an identifier of the particular BSS and (ii) a time offset value indicating a time difference between an end of a contention free period in the particular BSS and an end of a contention free period in the BSS based on which the channel access timer is currently set at the communication device, so that the communication device can keep track of the respective contention free periods in the multiple BSSs heard by the communication device, receive a data unit, determine based on a comparison of (i) a duration indication included in the data unit and (ii) a current value of the channel access timer, whether the channel access timer should be reset, and when it is determined that the duration indicated in the data unit is greater than the current value of the channel access timer, reset the channel access timer based on the duration indicated in the data unit, and update time offset values in the BSS record to indicate offsets with respect to the channel access timer reset based on the duration indicated in the data unit.

11. The communication device of claim 10, the one or more integrated circuits are configured to set the channel access timer based on a duration indication included in a data unit that (i) is received by the communication device and (ii) is addressed to another communication device.

12. The communication device of claim 10, wherein the identifier of the particular BSS is a BSS color obtained from a signal field of a preamble of a data unit corresponding to the particular BSS, wherein the data unit (i) is received by the communication device and (ii) is addressed to another communication device.

13. The communication device of claim 10, wherein the BSS record comprises one of (i) a linear data structure, (ii) a min heap data structure or (iii) a max heap data structure.

14. The communication device of claim 10, wherein the one or more integrated circuits are further configured to, before the channel access timer reaches zero, receive a contention free end (CF-end) data unit;

identify a BSS to which the CF-end data unit corresponds;

determine, whether the channel access timer is currently set based on the BSS to which the CF-end data unit corresponds; and when it is determined that the channel access timer is currently set based on the BSS to which the CF-end data unit corresponds, determine, based on the BSS record, a value for resetting the channel access timer, and reset the channel access timer to the determined value.

15. The communication device of claim 14, wherein the one or more integrated circuits are further configured to, when it is determined that the channel access timer is currently not set based on the BSS to which the CF-end data unit corresponds, delete a corresponding entry from the BSS record.

16. The communication device of claim 10, wherein the one or more integrated circuits are further configured to, before the channel access timer reaches zero, receive a trigger data unit to trigger an uplink transmission by the communication device, and determine, based on the BSS record, whether the communication device is to refrain from transmitting the triggered uplink transmission.

17. The communication device of claim 16, wherein the communication device is associated with a particular BSS, and wherein the one or more integrated circuits are configured to determine whether the communication device is to refrain from transmitting the uplink transmission at least by determining whether the BSS record indicates on-going contention free periods in one or more BSSs other than the particular BSS with which the communication device is associated.

18. The communication device of claim 17, wherein the one or more integrated circuits are further configured to, in response to determining that the BSS record indicates an on-going contention free period in only the BSS with which the communication device is associated, the uplink transmission triggered by the trigger data unit.

* * * * *